(12) United States Patent
Davidson et al.

(10) Patent No.: US 12,440,601 B2
(45) Date of Patent: Oct. 14, 2025

(54) SELF-ADHESIVE MULTI-FIBER MATERIALS

(71) Applicant: The Trustees of the University of Pennsylvania, Philadelphia, PA (US)

(72) Inventors: Matthew Davidson, Philadelphia, PA (US); Jason Alan Burdick, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 953 days.

(21) Appl. No.: 17/201,446

(22) Filed: Mar. 15, 2021

(65) Prior Publication Data

US 2021/0308320 A1 Oct. 7, 2021

Related U.S. Application Data

(60) Provisional application No. 63/004,545, filed on Apr. 3, 2020.

(51) Int. Cl.
*A61L 24/08* (2006.01)
*A61L 24/00* (2006.01)
*C09J 9/00* (2006.01)
*C09J 105/08* (2006.01)

(52) U.S. Cl.
CPC ........... *A61L 24/08* (2013.01); *A61L 24/0015* (2013.01); *C09J 9/00* (2013.01); *C09J 105/08* (2013.01)

(58) Field of Classification Search
CPC ........ A61L 24/08; A61L 24/0015; C09J 9/00; C09J 105/08
See application file for complete search history.

(56) References Cited

U.S. PATENT DOCUMENTS

| 4,984,570 A | 1/1991 | Langen et al. |
|---|---|---|
| 8,741,201 B2 | 6/2014 | Huang et al. |
| 8,864,843 B2 | 10/2014 | Lu et al. |
| 9,326,894 B2 | 5/2016 | Gladman et al. |
| 2004/0241436 A1 | 12/2004 | Hsieh et al. |
| 2010/0285101 A1 | 11/2010 | Moore et al. |
| 2012/0148522 A1* | 6/2012 | Schlenoff ............... A61P 43/00 521/146 |
| 2017/0049705 A1* | 2/2017 | Mateescu ................. A61P 3/10 |

FOREIGN PATENT DOCUMENTS

| JP | 2739062 B2 | 4/1998 |
|---|---|---|
| JP | 2011-516751 A | 5/2011 |

(Continued)

OTHER PUBLICATIONS

Ying Ji, Shuo Shan, Mingyu He, Chih-Chang Chu, "Inclusion complex from cyclodextrin-grafted hyaluronic acid and pseudo protein as biodegradable nano-delivery vehicle for gambogic acid", Oct. 15, 2017, Acta Biomaterialia vol. 62, p. 234-245 (Year: 2017).*

(Continued)

*Primary Examiner* — Joseph S Del Sole
*Assistant Examiner* — Andrea Wu
(74) *Attorney, Agent, or Firm* — BakerHostetler

(57) ABSTRACT

Provided is a multi-fiber system that undergoes new chemical bonds in response to mechanical manipulation and has self-adhesive properties based on specific chemical reactions.

14 Claims, 33 Drawing Sheets

(56) References Cited

FOREIGN PATENT DOCUMENTS

| JP | 5654356 B2 | 1/2015 | |
| WO | WO-2010070458 A2 * | 6/2010 | ............ A61L 24/08 |

OTHER PUBLICATIONS

Abhilash et al., "Remodeling of fibrous extracellular matrices by contractile cells: predictions from discrete fiber network simulations," Biophys. J., vol. 107, 2014, pp. 1829-1840.

Arslantunali, D., et al., "Peripheral Nerve Conduits: Technology Update," Medical Devices: Evidence and Research, vol. 7, Dec. 2014, pp. 405-424.

Baker et al., "Cell-mediated fibre recruitment drives extracellular matrix mechanosensing in engineered fibrillar microenvironments," Nat. Mater., vol. 14, 2015, pp. 1262-1268.

Ban et al., "Mechanisms of Plastic Deformation in Collagen Networks Induced by Cellular Forces," Biophys. J., vol. 114, 2018, pp. 450-461.

Ban et al., "Strong triaxial coupling and anomalous Poisson effect in collagen networks," Proc. Natl. Acad. Sci., vol. 116, 2019, pp. 6790-6799.

Bonnevie et al., "Aberrant mechanosensing in injured intervertebral discs as a result of boundary-constraint disruption and residual-strain loss," Nat. Biomed. Eng., vol. 3, 2019, pp. 998-1008.

Britton et al., "Contribution of nascent cohesive fiber-fiber interactions to the non-linear elasticity of fibrin networks under tensile load," Acta Biomater., vol. 94, 2019, pp. 514-523.

Burla et al., "From mechanical resilience to active material properties in biopolymer networks", Nat. Rev. Phys., vol. 1, 2019, pp. 249-263.

Carey et al., "Local extracellular matrix alignment directs cellular protrusion dynamics and migration through Rac1 and FAK," Integr. Biol., vol. 8, 2016, pp. 821-835.

Chaurasia, V.K., "Reusable Adhesive Tapes from Electrospun Polymer Fibers," The University of Akron, May 4, 2015, pp. 35.

Cheema et al., "Engineering Functional Collagen Scaffolds: Cyclical Loading Increases Material Strength and Fibril Aggregation," Adv. Funct. Mater., vol. 17, 2007, pp. 2426-2431.

Choi, S-S., et al., "Formation of Interfiber Bonding in Electrospun Poly(etherimide) Nanofiber Web," Journal of Materials Science, vol. 39, No. 4, Feb. 2004, pp. 1511-1513.

Davidson et al., "Engineered Fibrous Networks To Investigate the Influence of Fiber Mechanics on Myofibroblast Differentiation," ACS Biomater. Sci. Eng., vol. 5, 2019, pp. 3899-3908.

Davidson, M.D., et al., "Mechanochemical Adhesion and Plasticity in Multifiber Hydrogel Networks," Advanced Materials, vol. 32, Issue 8, Feb. 25, 2020, 1905719, pp. 31.

Gramlich et al., "Synthesis and orthogonal photopatterning of hyaluronic acid hydrogels with thiol-norbornene chemistry," Biomaterials, vol. 34, 2013, pp. 9803-9811.

Hibbett, Karlsson, and Sorensen, ABAQUS/Standard: User's Manual, Hibbitt, Karlsson & Sorensen, 1998.

Highley et al., "Recent advances in hyaluronic acid hydrogels for biomedical applications," Curr. Opin. Biotechnol., vol. 40, 2016, pp. 35-40.

Kim et al., "Fibrous hyaluronic acid hydrogels that direct MSC chondrogenesis through mechanical and adhesive cues," Biomaterials, vol. 34, 2013, pp. 5571-5580.

Kim et al., "Fibrous Scaffolds with Varied Fiber Chemistry and Growth Factor Delivery Promote Repair in a Porcine Cartilage Defect Model," Tissue Eng., Part A, vol. 21, 2015, pp. 2680-2690.

Kouwer et al., "Responsive biomimetic networks from polyisocyanopeptide hydrogels," Nature, vol. 493, 2013, pp. 651-655.

Kurniawan et al., "Fibrin Networks Support Recurring Mechanical Loads by Adapting their Structure across Multiple Scales," Biophys. J., vol. 111, 2016, pp. 1026-1034.

Li et al., "Micromechanical anisotropy and heterogeneity of the meniscus extracellular matrix," Acta. Biomater., vol. 54, 2017, pp. 356-366.

Lou et al., "Dynamic Hyaluronan Hydrogels with Temporally Modulated High Injectability and Stability Using a Biocompatible Catalyst," Adv. Mater., vol. 30, 2018, e1705215.

Lv, F-Y., et al., "In situ precise electrospinning of medical glue fibers as nonsuture dural repair with high sealing capability and flexibility," International Journal of Nanomedicine, vol. 11, Aug. 29, 2016, pp. 4213-4220.

Matsuda et al., "Mechanoresponsive self-growing hydrogels inspired by muscle training," Science, vol. 363, 2019, pp. 504-508.

McKinnon et al., "Biophysically defined and cytocompatible covalently adaptable networks as viscoelastic 3D cell culture systems," Adv. Mater., vol. 26, 2014, pp. 865-872.

Mitchell, Role of Anisotropy in Tissue Engineering, Procedia Eng., Elsevier, New York, 2013, p. 117-125.

Muheremu, A., "Past, Present, and Future of Nerve Conduits in the Treatment of Peripheral Nerve Injury," BioMed Research International, vol. 2015, No. 21, Sep. 2015, pp. 1-6.

Nam et al., "Strain-enhanced stress relaxation impacts nonlinear elasticity in collagen gels," Proc. Natl. Acad. Sci. USA., vol. 113, 2016, pp. 5492-5497.

Perazzo, A., et al., "Flow-Induced Gelation of Microfiber Suspensions", Proceedings of the National Academy of Sciences, vol. 114, No. 41, Sep. 18, 2017, pp. E8557-E8564.

Peters et al., "Myocardial architecture and ventricular arrhythmogenesis," Circulation, vol. 97, 1998, pp. 1746-1754.

Purcell et al., "Injectable and bioresponsive hydrogels for on-demand matrix metalloproteinase inhibition," Nat. Mater., vol. 13, 2014, pp. 653-661.

Qu et al., "Programmed biomolecule delivery to enable and direct cell migration for connective tissue repair," Nat. Commun., vol. 8, 2017, 1780.

Quinn et al., "Preconditioning is correlated with altered collagen fiber alignment in ligament," J. Biomech. Eng., vol. 133, 2011, 64506.

Raghavan, B.K., et al., "Control of Inter-Fiber Fusing for Nanofiber Webs via Electrospinning," Journal of Engineered Fibers and Fabrics, vol. 6, Issue 4, Dec. 1, 2011, pp. 1-5.

Ramirez et al., "Mechanochemical strengthening of a synthetic polymer in response to typically destructive shear forces," Nat. Chem., vol. 5, 2013, pp. 757-761.

Riks, "An incremental approach to the solution of snapping and buckling problems," Int. J. Solids Struct., vol. 15, 1979, pp. 529-551.

Romera et al., "Strain Stiffening Hydrogels through Self-Assembly and Covalent Fixation of Semi-Flexible Fibers," Angew. Chem., Int. Ed., vol. 56, 2017, pp. 8771-8775.

Shi. Q., et al., "Do Electrospun Polymer Fibers Stick?," Langmuir, vol. 26, No. 17, Aug. 4, 2010, pp. 14188-14193.

Song et al., "Vascular Tissue Engineering: Progress, Challenges, and Clinical Promise," Cell. Stem. Cell., vol. 22, 2018, 608.

Storm et al., "Nonlinear elasticity in biological gels", Nature, vol. 435, 2005, pp. 191-194.

Susilo et al., "Collagen network strengthening following cyclic tensile loading," Interface Focus, vol. 6, 2016, 20150088.

Tower et al., "Fiber alignment imaging during mechanical testing of soft tissues," Ann. Biomed. Eng., vol. 30, 2002, pp. 1221-1233.

Tran et al., "Strain-stiffening gels based on latent crosslinking," Soft. Matter., vol. 13, 2017, pp. 9007-9014.

Varagnolo, S., et al., "Highly sticky surfaces made by electrospun polymer nanofibers," RSC Advances, vol. 7, No. 10, Jan. 2017, pp. 5836-5842.

Vos et al., "Programming the mechanics of cohesive fiber networks by compression," Soft Matter., vol. 13, 2017, pp. 8886-8893.

Wade et al., "Nanofibrous hydrogels with spatially patterned biochemical signals to control cell behavior," Adv. Mater., vol. 27, 2015, pp. 1356-1362.

Wade et al., "Protease-degradable electrospun fibrous hydrogels," Nat. Commun., vol. 6, 2015, 6639.

Wang et al., "Biomimetic electrospun nanofibrous structures for tissue engineering," Mater. Today, vol. 16, 2013, pp. 229-241.

(56) References Cited

OTHER PUBLICATIONS

Wang et al., "Three-dimensional extrusion bioprinting of single- and double-network hydrogels containing dynamic covalent crosslinks," J. Biomed. Mater. Res., vol. 106, 2018, pp. 865-875.

Yang et al., "From nano to micro to macro: Electrospun hierarchically structured polymeric fibers for biomedical applications," Prog. Polym. Sci., vol. 81, 2018, pp. 80-113.

\* cited by examiner

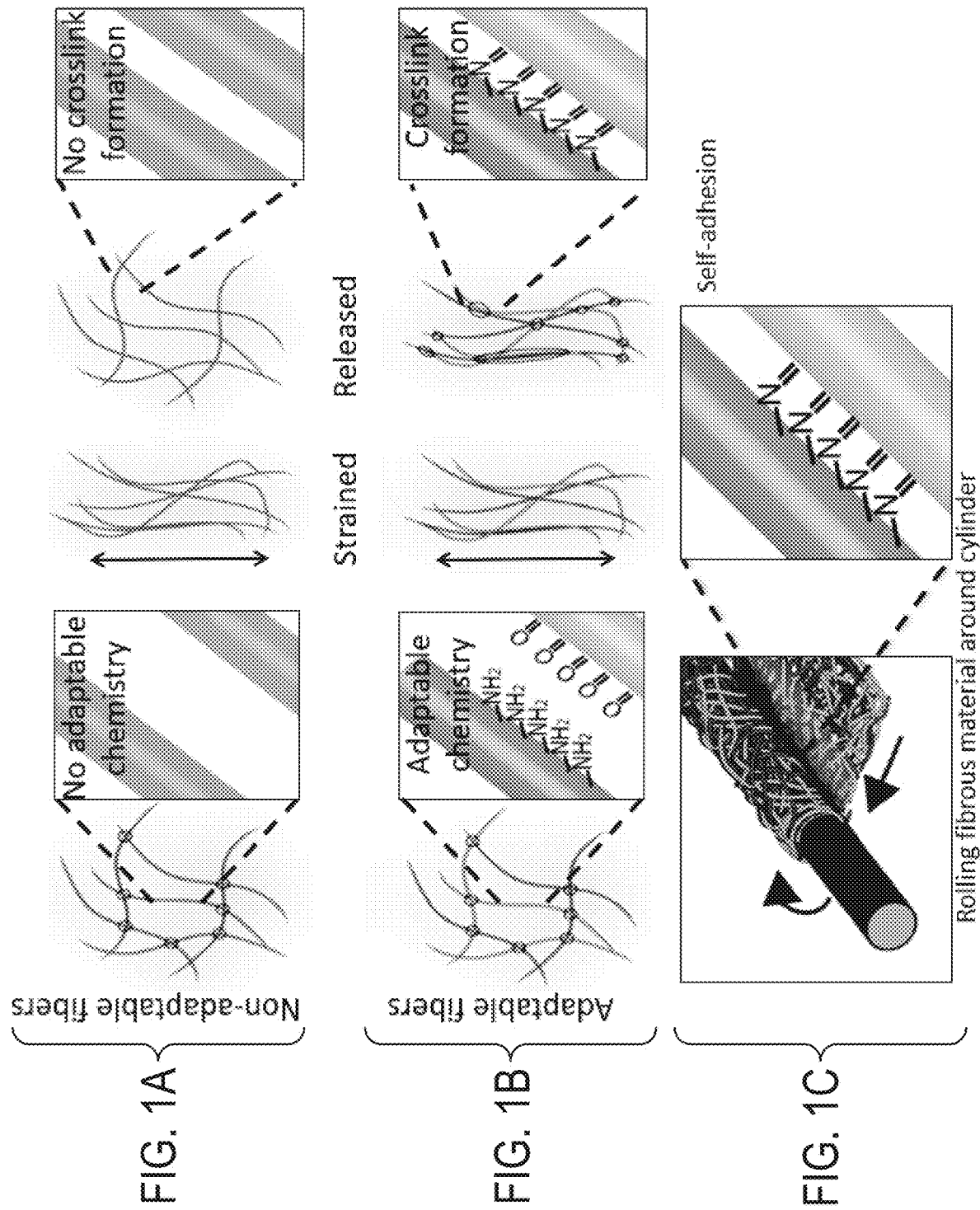

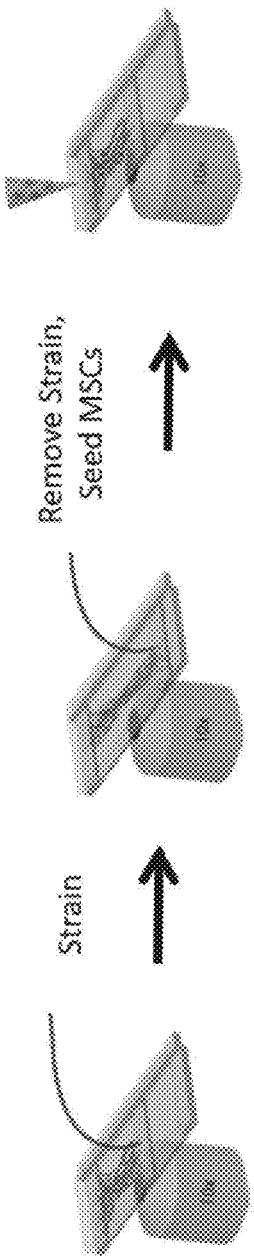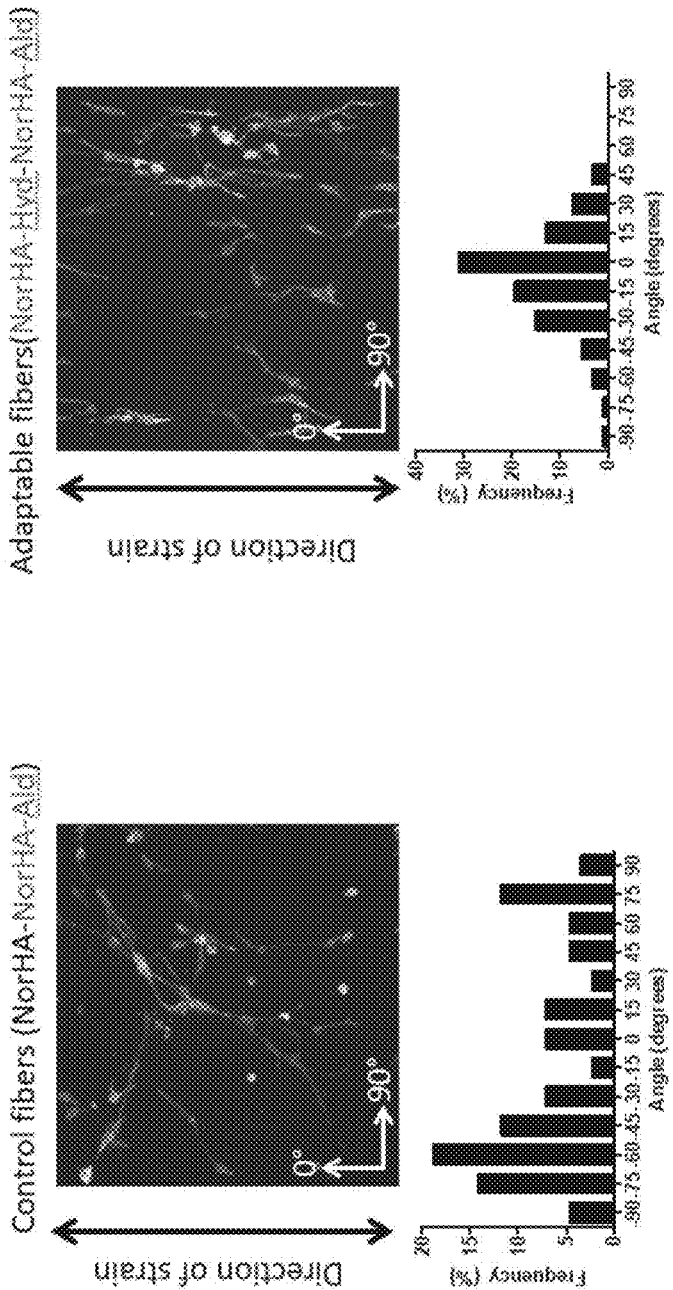
FIG. 4A
FIG. 4B
FIG. 4C

Adaptable fibers

Diluted hydrazide (50% less bonds)

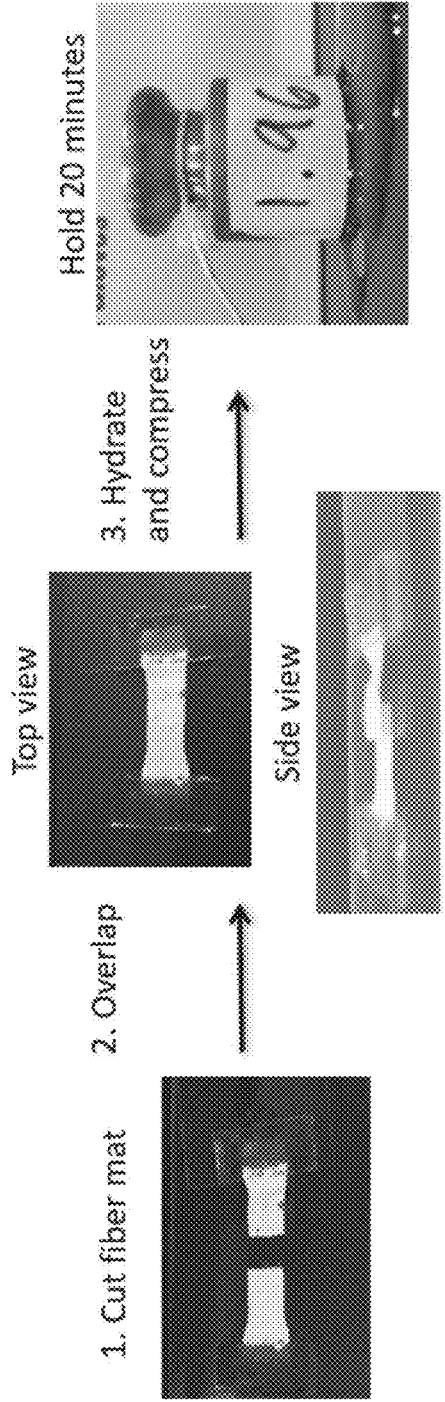
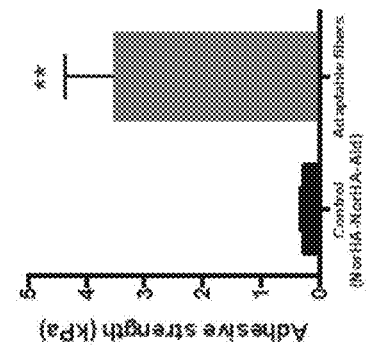
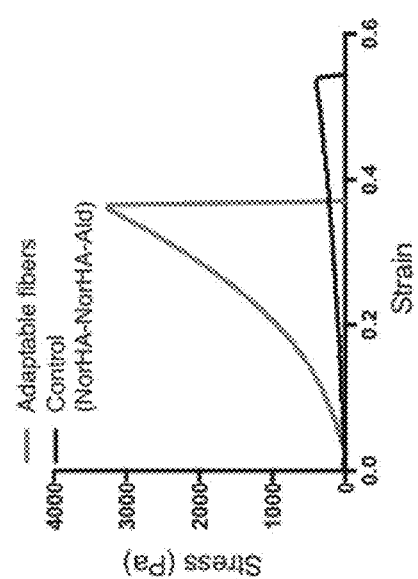
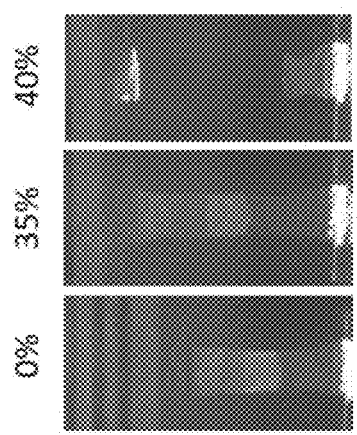
FIG. 6A
FIG. 6B
FIG. 6C
FIG. 6D

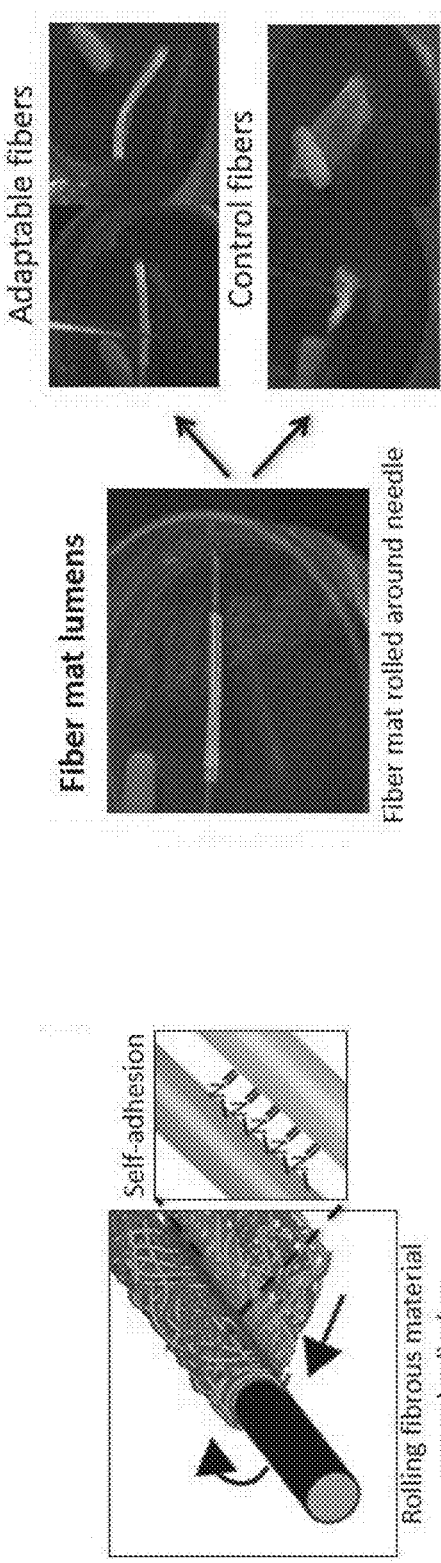
FIG. 7A
FIG. 7B
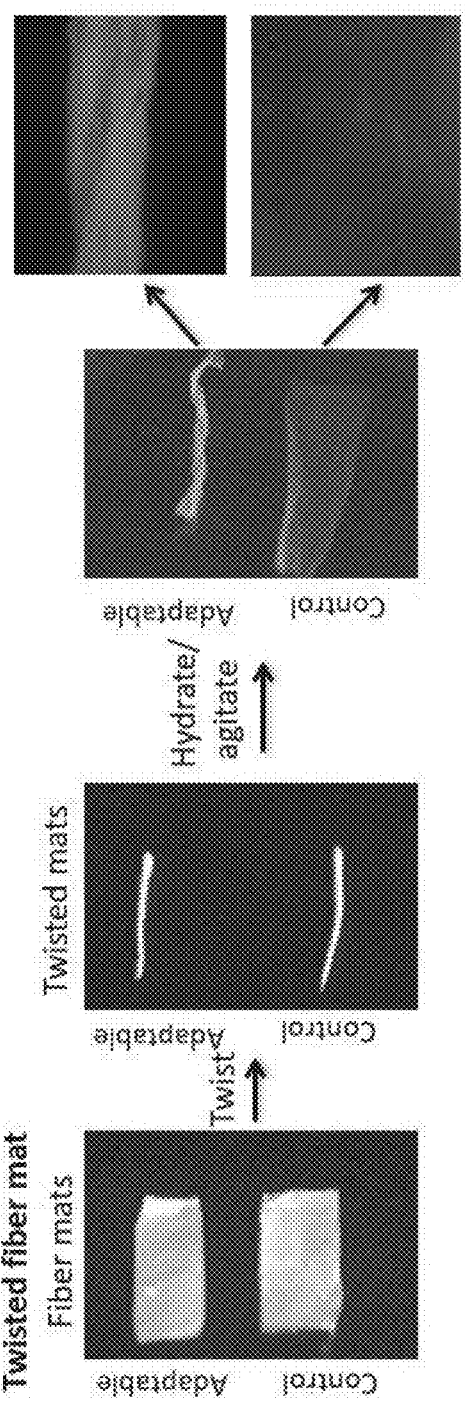
FIG. 7C

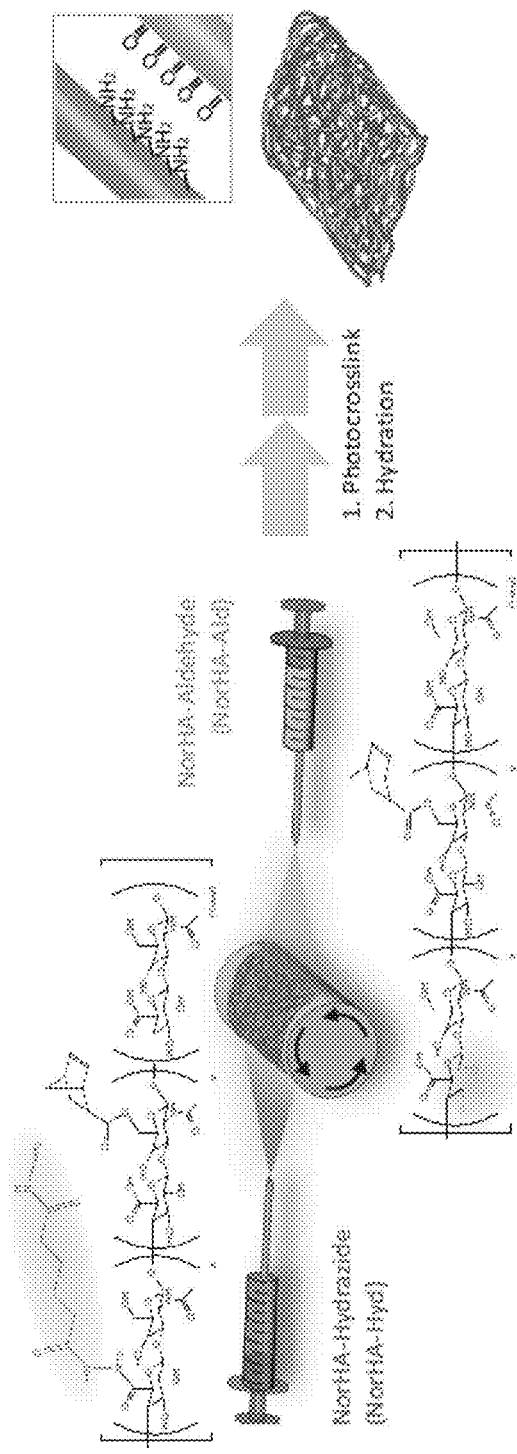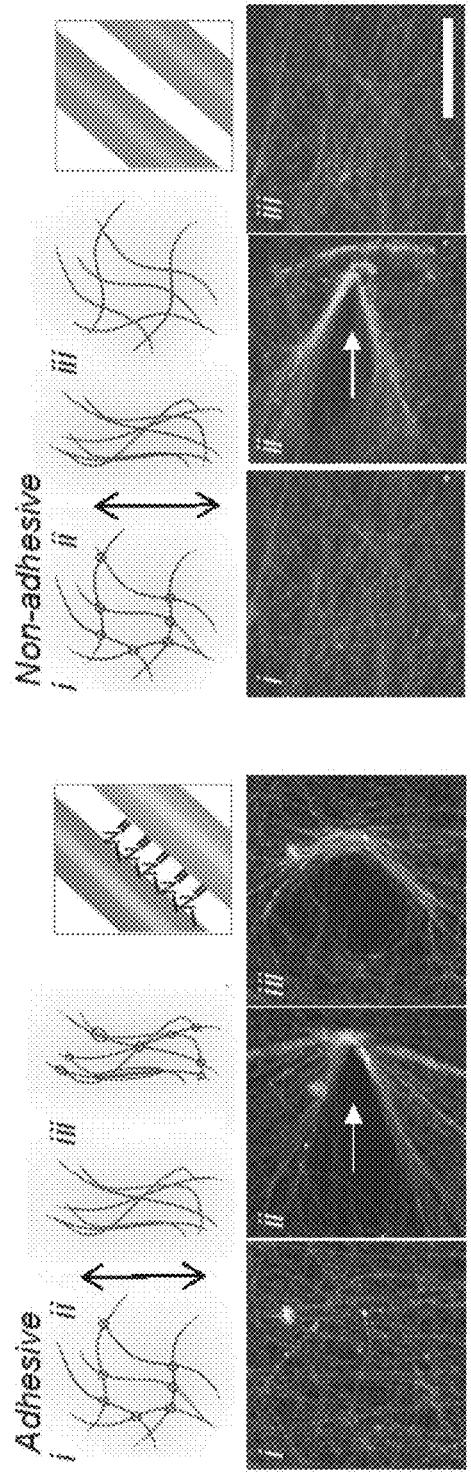
FIG. 9A
FIG. 9B
FIG. 9C

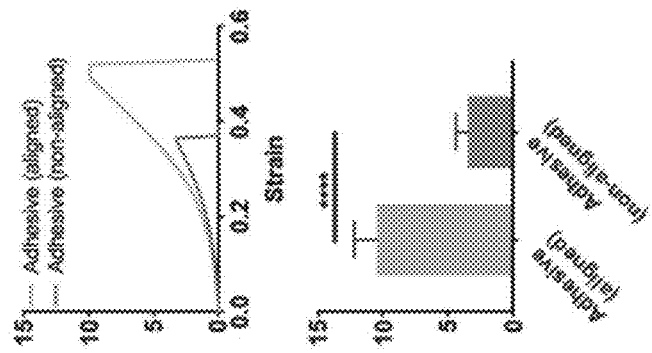
FIG. 12D
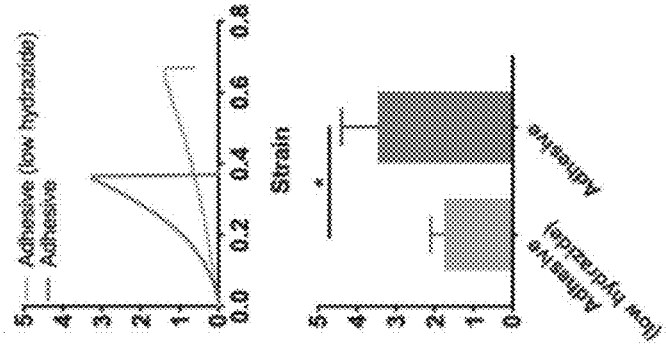
FIG. 12C
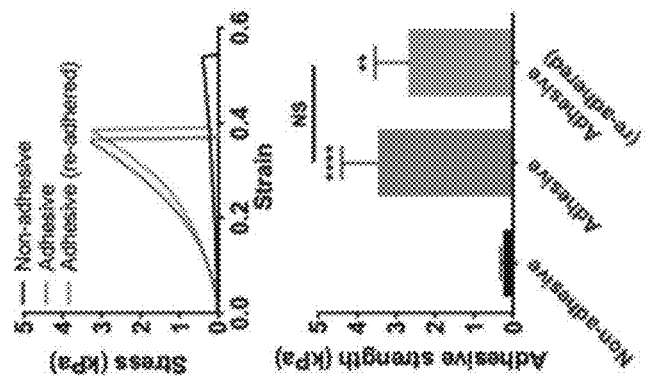
FIG. 12B
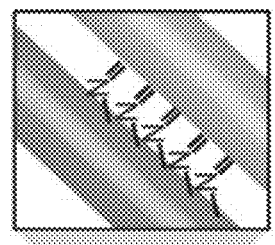
FIG. 12A

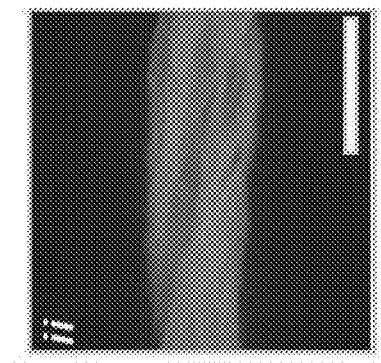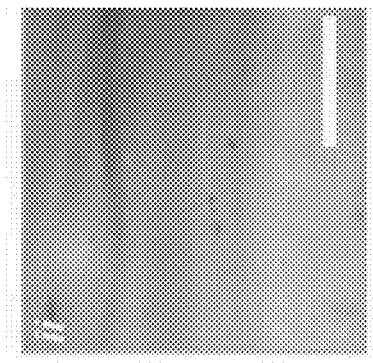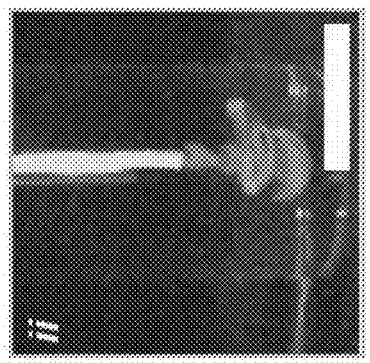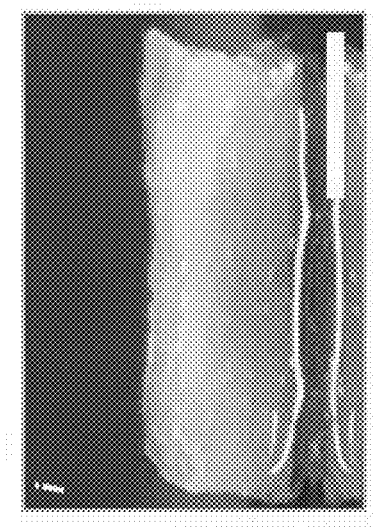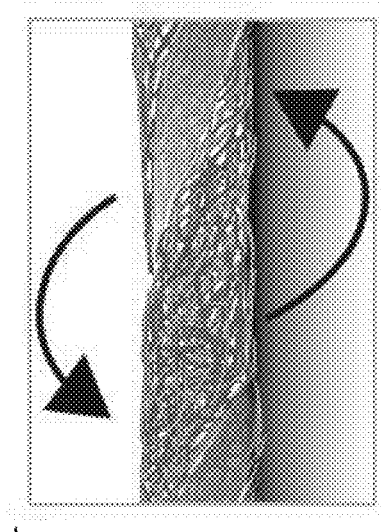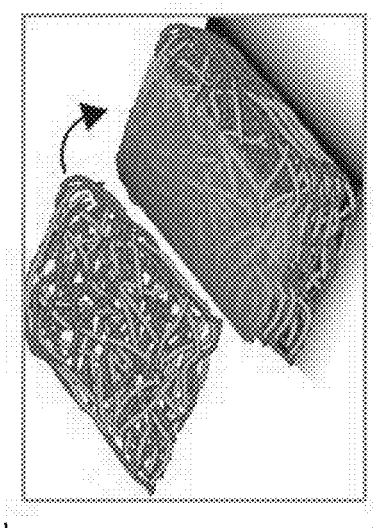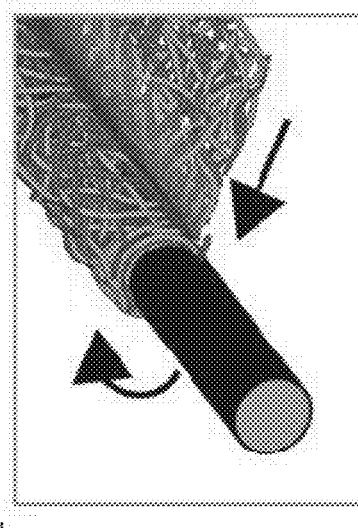
FIG. 13A   FIG. 13B   FIG. 13C

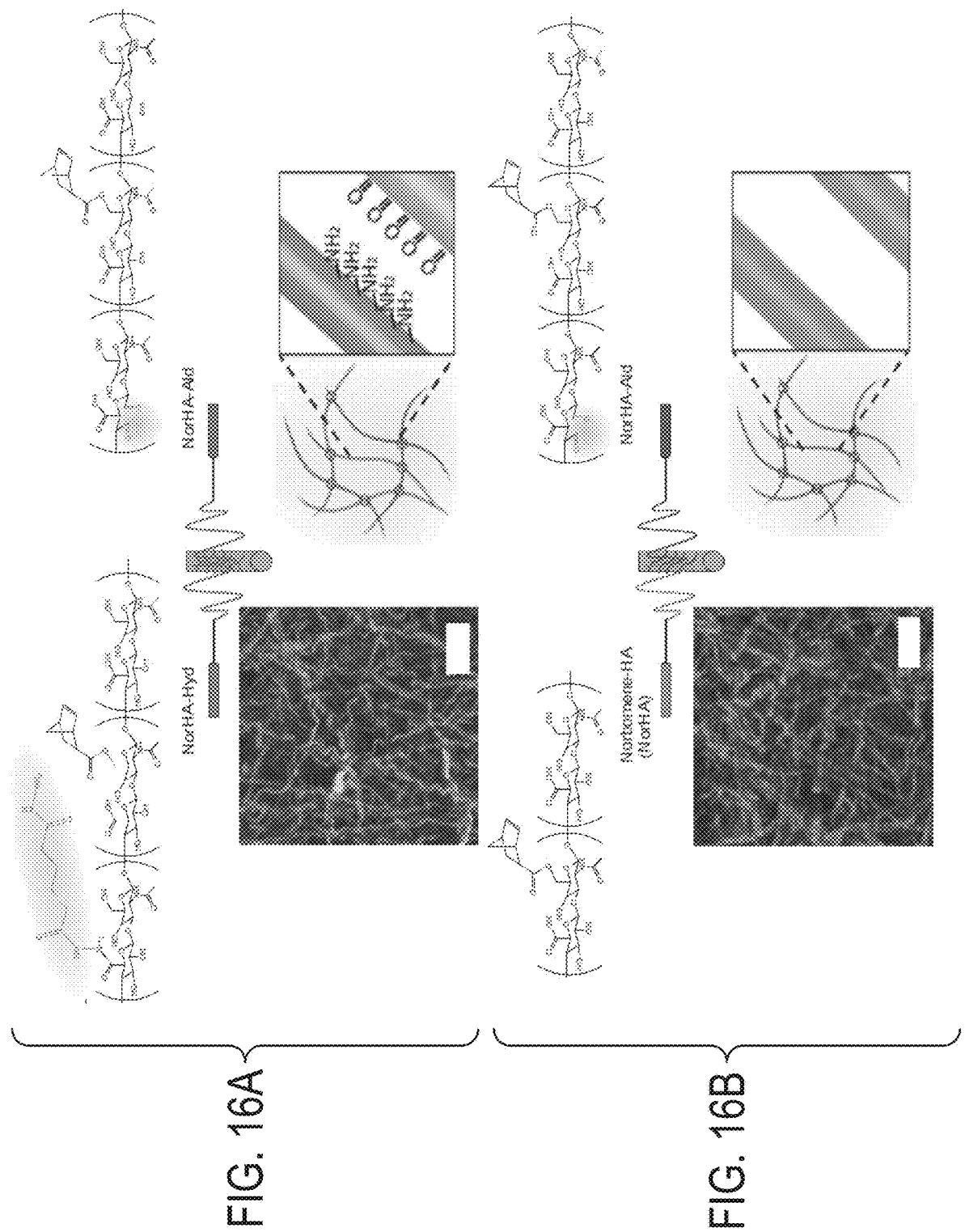

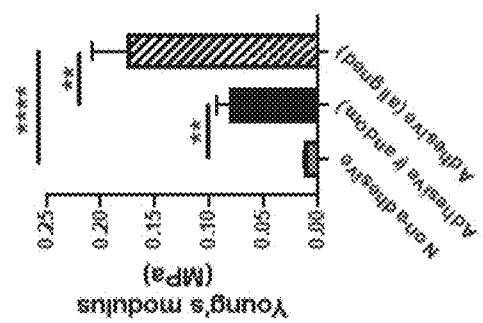
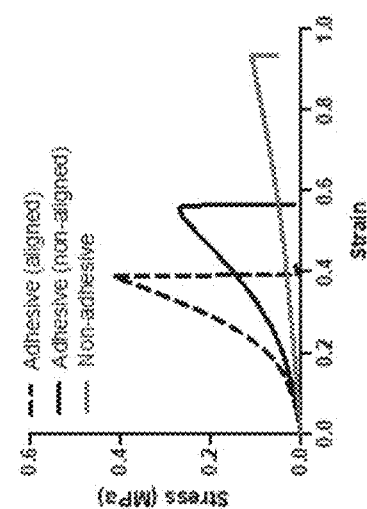
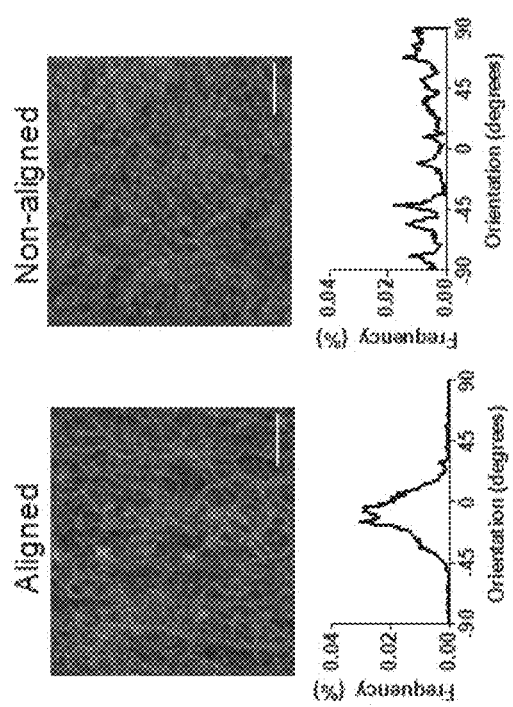
FIG. 26C
FIG. 26B
FIG. 26A

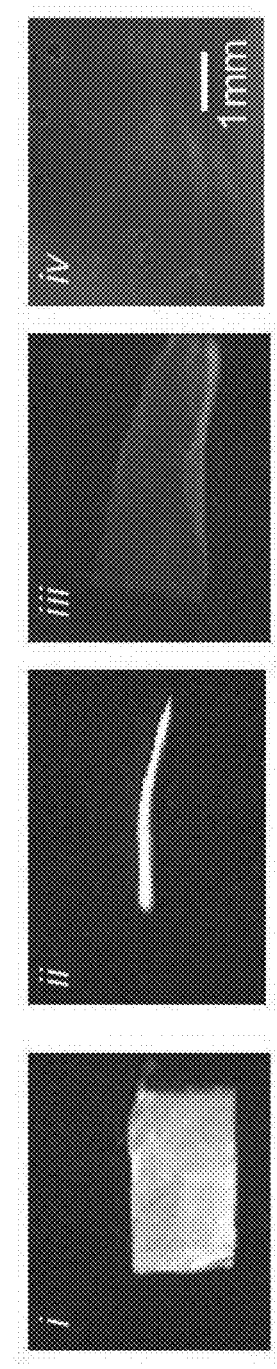
FIG. 31A
FIG. 31B

SELF-ADHESIVE MULTI-FIBER MATERIALS

CROSS-REFERENCE TO RELATED APPLICATIONS

This application claims priority to and the benefit of U.S. Patent Application No. 63/004,545, "Self-Adhesive Multi-Fiber Materials" (filed Apr. 3, 2020), the entirety of which application is incorporated herein by reference for any and all purposes.

GOVERNMENT RIGHTS

This invention was made with government support under F32 DK117568 awarded by the National Institutes of Health and DMR-1120901 awarded by the National Science Foundation. The government has certain rights in the invention.

TECHNICAL FIELD

The present disclosure relates to the field of fibrous materials, to the field of polymer adhesives, to the field of smart materials, and to the field of polymer crosslinking.

BACKGROUND

Fibrous materials are utilized in many fields ranging from tissue engineering to textiles because of their desirable properties such as high porosity, high surface area, mechanical strength, and flexibility. Fibrous materials are composed of many individual fibers generated from natural, synthetic and hybrid polymers using various processes. The fibers within these materials can be fabricated from the same polymer (single fiber materials) or from a mixture of polymers (multifiber materials). The properties of fibrous materials such as stiffness are modulated by intra-fiber bonds (bonds within fibers) and inter-fiber bonds (bonds between fibers).

To date, however, the art lacks a technology that allows for efficient creation and control of such inter-fiber bonds. Accordingly, there is a long-felt need in the art for such a technology.

SUMMARY

In meeting the described long-felt needs, the present disclosure first provides a fibrous composition, comprising: a first fiber population that comprises a plurality of first fibers having a first bonding group disposed at least on a surface of the first fibers, the first fibers comprising a first matrix material; a second fiber population that comprises a plurality of second fibers having a second bonding group disposed at least on a surface of the second fibers, the second fibers comprising a second matrix material, (a) the first bonding group being configured to interact with the second bonding group so as to effect crosslinking between at least one fiber of the first fiber population and at least one fiber of the second fiber population upon application of a mechanical manipulation that reduces a distance between the first and the second bonding groups, or (b) the first bonding group being configured to interact with the second bonding group so as to effect crosslinking between at least one fiber of the first fiber population and at least one fiber of the second fiber population upon application of a stimulus, or (c) both (a) and (b). (As explained elsewhere herein, the first matrix material and the second matrix material can be same material, but can also be different materials.)

Also provided are methods, comprising: effecting application of a mechanical manipulation, a stimulus, or both to a fibrous composition according to the present disclosure.

Additionally provided are methods, comprising: with a composition that comprises (i) a first fiber population, where the fibers comprise a first bonding group disposed on a surface of the first fiber and (ii) a second fiber population, where the fibers comprise a second bonding group disposed on a surface of the second fiber and the first bonding group being configured to interact with the second bonding group so as to effect a crosslink between the first and the second fiber populations, (a) effecting a mechanical manipulation that reduces a distance between the first bonding group and the second bonding group under conditions sufficient to give rise to a crosslink between the first and the second fiber populations; (b) effecting application of a stimulus so as to effect a crosslink between the first fiber and the second fiber upon application of a stimulus; or (c) both (a) and (b).

Further provided are methods, comprising: forming a first fiber population comprising a plurality of first fibers, a first fiber comprising a first matrix material and a first bonding group disposed at least on a surface of the first fiber; forming a second fiber population comprising a plurality of second fibers, a second fiber comprising a second matrix material and a second bonding group disposed at least on a surface of the second fiber. (As explained elsewhere herein, the first matrix material and the second matrix material can be same material but can also be different materials.)

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various aspects discussed in the present document. In the drawings:

FIGS. 1A-1C provide a schematic of an adaptable multi-fiber system. FIG. 1A Typical fiber systems do not contain adaptable chemistries that allow for the formation of new crosslinks when the material is mechanically manipulated (strained here). When mechanical stimulus is removed, the fibers will elastically recoil back to their original conformation. FIG. 1B Adaptable multi-fiber systems have specific pendant chemistries that can form new bonds when the material is strained. As an example, hydrazone bonds (right) are shown forming between aldehyde and hydrazide containing fibers when the fibrous material is strained and fibers come into contact with one another. FIG. 1C Schematic of self-adhesive properties of adaptable fibers. When layers of adaptable fibers come into contact, they form bonds, which bonds adhere the layers together.

FIG. 2A Hyaluronic acid was modified with norbornene groups (NorHA) to covalently crosslink electrospun fibers, and subsequently modified with hydrazides (top) or aldehydes (bottom), which can react to form hydrazone bonds. FIG. 2B Representative images of hydrazide NorHA fibers (top) or aldehyde NorHA fibers (bottom), within a multi-fiber material. FIG. 2C Schematic of mixed fiber electrospinning and representative image of adaptable multi-fiber material.

FIG. 3A Schematic of suspended fiber network and micromanipulator/micropipette-mediated straining experiment. FIG. 3B Snap shots of control (NorHA, left) and adaptable fiber (right) networks before (top), during (middle) and after loading (bottom) with micropipette. Fiber network remodeling was sustained for 2 hours after remodeling with manipulator (bottom right). FIG. 3C Schematic of fiber mat straining experiment on microscope and FIG. 3D fiber network fiber orientation with representative images of before (top) during (middle) and after (bottom) straining fiber mats.

FIGS. 4A-4C illustrate that residual fiber alignment directs cell orientation in adaptable fibers after straining. FIG. 4A Schematic of fiber straining and subsequent seeding of cells experiment. FIG. 4B Representative image of cell alignment on control fiber mats that had previously been strained and quantification of cell alignment below. FIG. 4C Representative image of cell alignment on adaptable fiber mats that had previously been strained and quantification of cell alignment below.

FIGS. 5A-5B Schematics of tensile straining experiments without FIG. 5A and with holding at 50% strain FIG. 5B, and subsequent loading to failure. FIG. 5C-5F Fiber mats were strained and forces were measured on an Instron tensile testing machine with a 5N load cell. FIG. 5C Tangent modulus of adaptable fiber mats strained to failure or FIG. 5D loaded to 50% strain, held for 20 minutes, and then loaded to failure. The line indicates point where material was held at 50% strain. FIG. 5E Tangent modulus of adaptable fiber mats with diluted hydrazide fibers (50% less adaptable bonds) strained to failure or FIG. 5F loaded to 50% strain, held for 20 minutes, and then loaded to failure. The line indicates point where material was held at 50% strain.

FIGS. 6A-6D illustrate the adaptable chemistry enhances adhesion strength of fiber mats. FIG. 6A Schematic of setup for measuring adhesion between layers of fiber mats. FIG. 6B Representative images of tensile testing experiments to measure adhesion strength with overlapped fiber mats. Top shows percent of strain in the image. FIG. 6C Representative stress strain curves from adhesion strength experiments and FIG. 6D average adhesion strength with control and adaptable fibers.

FIGS. 7A-7C illustrate the self-adhesion of adaptable multi-fiber system. FIG. 7A Schematic of mechanical compaction of fibrous materials to enable self-adhesion between layers of the fibrous sheet. When different layers of the fibrous material contact one another, new bonds form, which gives the material a self-adhesive property. Hydrazone bond formation is shown as an example. FIG. 7B Electrospun fiber mats composed of the adaptable fibers shown in FIG. 2A-2C, or control fiber mats that do not contain hydrazides were rolled around a needle as in FIG. 7A, hydrated, removed from the needle and agitated in saline solution. FIG. 7C The same fiber mats used in FIG. 7B were twisted 360 degrees 10 times, and then hydrated and agitated in saline solution. Microscopic images of adaptable (top) and control (bottom) fiber mats after agitation.

FIG. 8a 20 pieces of fiber mat were FIG. 8B layered and then compressed and FIG. 8C hydrated in saline solution. FIG. 8D Image of hydrated fiber mat showing stability of shape while under mechanical agitation with stir bar stirring at 500 rpm in saline solution.

FIGS. 9A-9C illustrate mechanochemical interactions in multi-fiber hydrogel networks through the reaction of complementary chemical groups. FIG. 9A Schematic of the electrospinning of two fiber populations from hyaluronic acid modified with norbornenes (NorHA), as well as either hydrazides (NorHA-Hyd) or aldehydes (NorHA-Ald). Norbornenes are used for intra-fiber and inter-fiber crosslinking through a photoinitiated thiol-ene reaction to stabilize the fiber, while the hydrazides and aldehyde groups permit additional inter-fiber reactions when fibers are brought into contact. Inset shows hydrazide and aldehyde groups exposed on fiber surface after electrospinning, stabilization, and hydration. FIG. 9B Schematic (top) and fluorescent images (bottom) of mechanical strain-induced interactions between hydrazide and aldehyde containing NorHA fibers (i) before, (ii) during, and (iii) after applying strain for 40 minutes. After removal of strain, permanent deformations of "adhesive" fibers are observed through fluorescent microscopy. FIG. 9C Schematic (top) and fluorescent images (bottom) indicating a lack of mechanical strain-induced interactions in "non-adhesive" fiber control under the same loading conditions. The multi-fiber hydrogel control is fabricated from mixed fibers of unmodified NorHA and NorHA-Ald fiber populations, where no chemical reaction is expected when the fibers contact each other. Scale bar is 100 µm.

FIG. 10A Schematic of the experimental device to strain fibrous hydrogel networks, where clamped samples were strained 50%, held for 1 hour, and the strain removed. FIG. 10B Left: representative confocal images of adhesive fibers (i) before straining, (ii) while strained, and (iii) after strain removal. Right: normalized frequency of fiber orientations before and after straining (flat line indicates no orientation, whereas the presence of a peak indicates orientation at that angle). FIG. 10C Left: fiber network model of adhesive fibers (i) before straining, (ii) while strained, and (iii) after strain removal. Right: normalized frequency of fiber orientations before and after straining. Scale bar is 50 µm, ***$p \leq 0.001$.

FIG. 11A Adhesive fibers were strained to 50%, held for 10 minutes, and then strain removed. Images of the sample from the side before straining (left) and after strain removal (right). FIG. 11B Representative plot of the experimental tangent modulus ($E_t$) (circles) from adhesive fibers strained with holding at 50% strain (left) or without holding (right). Plots also include results of $E_t$ determined through a continuum model simulation of these loading conditions (diamonds). Scale bar is 15 mm.

FIGS. 12A-12D illustrate interfacial bonding with adhesive fibers. FIG. 12A Schematic of interfacial bonding between layers of adhesive fibers assessed with tensile loading. FIG. 12B Representative stress strain curves during interfacial adhesion testing (top) and average adhesive strength (bottom) of non-adhesive, adhesive, and adhesive fibers that have been re-adhered after one cycle of adhering and breaking adhesion. FIG. 12C Representative stress strain curves during interfacial adhesion testing (top) and average adhesive strength (bottom) of adhesive fibers with low hydrazide concentration (20% of original hydrazide) and adhesive fibers from panel FIG. 12B for comparison. FIG. 12D Representative stress strain curves during interfacial adhesion testing (top) and average adhesive strength (bottom) of aligned adhesive fibers, and adhesive fibers from panel FIG. 12B for comparison. One-way ANOVA and Tukey post hoc test across all conditions was used to test for significance. *, , ** represent p≤0.05, p≤0.01, p≤0.0001.

FIGS. 13A-13C illustrate macroscale structure fabrication with inter-fiber and interfacial bonding in adhesive fibers. FIG. 13A Adhesive fibers were twisted into helical structures, hydrated and mechanically agitated to show maintenance of the folded helical structure at (i) low magnification (scale bar is 10 mm) and (ii) high magnification (scale bar is 2 mm). FIG. 13B Layered adhesive fibrous networks (shown with 20 layers) laminated into a thick construct, and visualized (i) after hydration and mechanical agitation (scale bar is 3 mm) and (ii) with fluorescence microscopy to examine interlamellar layers (scale bar is 0.5 mm). FIG. 13C Luminal structures fabricated with adhesive fibers by wrapping around a needle and visualized (i) during removal from the support needle and (ii) while extruding 70 kDa rhodamine labeled dextran (scale bar is 20 mm). Fibers were illuminated with ultraviolet light to enhance visualization (a (i), and c (i, ii)).

FIG. 14A Norbornene modification (~17%) of HA was determined by integration of the vinyl peaks (2H) relative to methyl group of HA (3H, shaded). FIG. 14B Hydrazide modification (~29%) of NorHA was determined by integration of the butyl linker (8H) relative to methyl group of HA (3H, shaded). FIG. 14C Norbornene modification (~33%) of high molecular weight HA was determined by integration of the vinyl peaks (2H) relative to methyl group of HA (3H, shaded). FIG. 14D Concentration of aldehydes in a 2 wt % solution of HA oxidized with increasing amounts of sodium periodate. A 1:4 (Sodium periodate:HA) ratio was used throughout this work as previously described.

FIG. 15A Only β-D-glucoronic acid units of HA (~180) were observed in norbornene modified HA (NorHA), while, FIG. 15A aldehyde modification of NorHA was confirmed with the appearance of carbonyl peaks (>200 ppm).

FIGS. 16A-16B illustrate fabrication of adhesive and non-adhesive multi-fibrous hydrogel networks. FIG. 16A Adhesive fibers were fabricated with NorHA-Hyd and NorHA-Ald via multi-fiber electrospinning. Image shows representative confocal microscopy of hydrated adhesive fibrous hydrogel network. FIG. 16B Non-adhesive fibers were fabricated with NorHA and NorHA-Ald via multi-fiber electrospinning. Image shows representative confocal microscopy (converted to gray-scale) of hydrated non-adhesive fibrous hydrogel network. Scale bar is 10 μm.

FIG. 17A Schematic of technique used where suspended fibers are compressed with a micropipette (~5 μm diameter bore size) by inserting the tip into the network and translating the tip 300 μm and holding for various amounts of time and then translating the tip back to its original position. FIG. 17B Images of suspended fibers before, during, and after compressive strain through manipulator for various holding times to assess the influence of this time on inter-fiber adhesion and plastic deformation. Scale bar is 50 μm.

FIG. 18A Aldehyde groups on adhesive fibers have a high affinity for tert-butyl carbazate (TBC). Hydrating fibers in a solution of TBC (50 mM) leads to deactivation of aldehydes preventing adhesion between fibers when in contact under strain. FIG. 18B Representative images of adhesive fibers (I) before, (II) during, and (III) after compression with manipulator after hydration in TBC. Scale bar is 100 μm.

FIG. 20A Representative confocal images of non-adhesive fibers before (left), during (middle) and after removing strain (right). FIG. 20B Orientation of fibers before and after straining and holding for 1 hour before removing strain. Scale bar is 50 μm.

FIG. 22A Rhodamine B-RGD peptides (0.05 mM-1 mM) and photoinitiator were incubated with non-adhesive (left) or adhesive (right) fibrous hydrogel networks, and conjugated to norbornene groups on HA through a photoinitiated thiol-ene reaction (5 mW/cm$^2$, 5 min). FIG. 22B Fluorescence intensity was quantified and used as a marker of RGD labeling efficiency. Scale is 500 μm. * represents p≤0.05.

FIG. 23A Adhesive and FIG. 23B non-adhesive fibrous hydrogels were conjugated with RGD, and then seeded with MSCs. After 4 hours, substrates were either (top) cultured statically for 24 hours without stretching or (bottom) strained to 50%, held for 1 hour, and then the strain was released and cells were cultured for 24 hours. After 24 hours, cultures were fixed, stained for f-actin and DNA, and imaged using a confocal microscope. Cell orientation was quantified as actin orientation measured using OrientationJ in FIJI. Scale bar is 100 μm.

FIG. 24A Non-adhesive fibers were strained to 50% strain, held for 10 minutes and then returned to their original length and imaged from the side before (left) and after (right) straining and holding. Scale bar is 15 mm. FIG. 24B Representative plots of tangent stiffness from non-adhesive fibers strained with holding at 50% strain (right) or without holding (left).

FIG. 25A Adhesive and FIG. 25B non-adhesive fibrous hydrogels were loaded in tension to 50% strain, unloaded, and then loaded again to 50% strain.

FIGS. 26A-26C illustrate the effects of microscale anisotropy and hydrazone bonds on fibrous hydrogel mechanics. FIG. 26A Aligned and non-aligned adhesive fibers (top) were fabricated and alignment was quantified from images (bottom). FIG. 26B Stress-strain curves of adhesive aligned (dotted), adhesive non-aligned (solid), and non-adhesive fibers strained in tension to failure, and FIG. 26C Young's moduli calculated at 5-15% strain. Scale bar is 20 μm. ,** represent p≤0.01, p≤0.0001.

FIG. 29A adhesive fibers were exposed to 75 kPa or 125 kPa of tensile stress, while FIG. 29B non-adhesive fibers were exposed to 0.3 kPa or 1 kPa of tensile stress.

FIGS. 31A-31B illustrates that non-adhesive fibers do not retain macroscale shape with mechanical agitation. FIG. 31A (I) Non-adhesive fiber mats were (II) twisted into helical structure and (III) hydrated with mechanical agitation. (IV) Fluorescent micrograph of fiber mat after agitation. FIG. 31B Non-adhesive fibers were (I) wrapped around an 18 G needle and hydrated, and then (II) removed from the needle with forceps and (III) mechanically agitated with a stir bar.

DETAILED DESCRIPTION OF ILLUSTRATIVE EMBODIMENTS

Figure 2B:
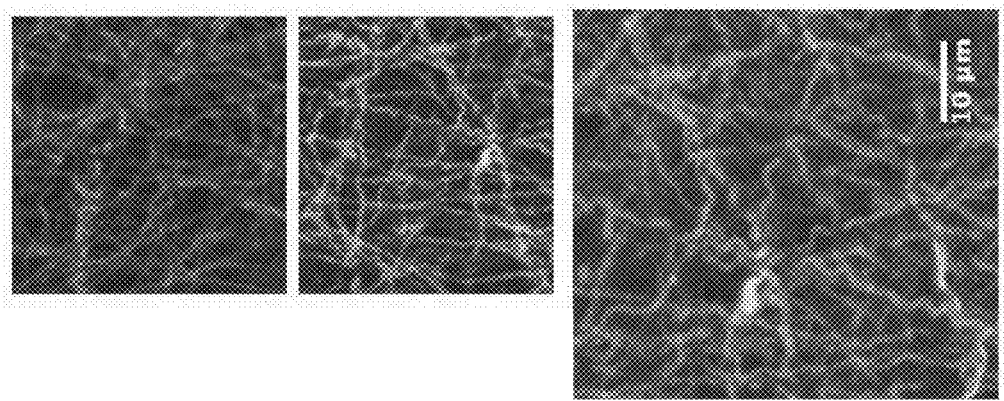
FIGS. 2A-2C provide an example of polymer synthesis and multi-fiber electrospinning.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

Figures

FIGS. 1A-1C provide a schematic of an adaptable multi-fiber system. FIG. 1A Typical fiber systems do not contain adaptable chemistries that allow for the formation of new crosslinks when the material is mechanically manipulated (strained here). When mechanical stimulus is removed, the fibers will elastically recoil back to their original conformation. FIG. 1B Adaptable multi-fiber systems have specific pendant chemistries that can form new bonds when the material is strained. As an example, hydrazone bonds (right) are shown forming between aldehyde (green) and hydrazide (red) containing fibers when the fibrous material is strained and fibers come into contact with one another. FIG. 1C Schematic of self-adhesive properties of adaptable fibers. When layers of adaptable fibers come into contact, they form bonds, which bonds adhere the layers together.

Figure 2A:
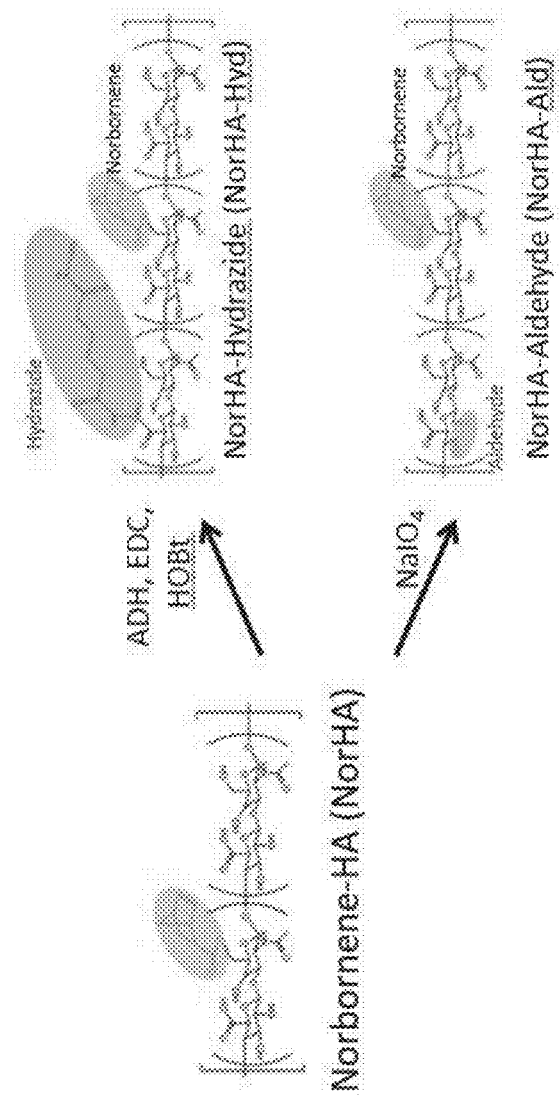
Figure 2C:
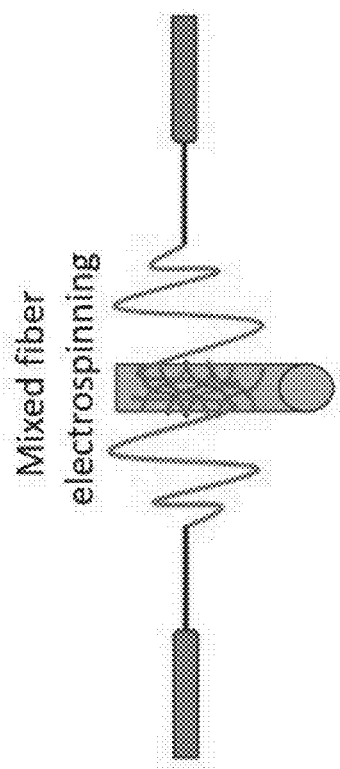

FIGS. 2A-2C provide an example of polymer synthesis and multi-fiber electrospinning. FIG. 2A Hyaluronic acid was modified with norbornene groups (NorHA) to covalently crosslink electrospun fibers, and subsequently modified with hydrazides (top) or aldehydes (bottom), which can react to form hydrazone bonds. FIG. 2B Representative images of hydrazide NorHA fibers (top) or aldehyde NorHA fibers (bottom), within a multi-fiber material. FIG. 2C Schematic of mixed fiber electrospinning and representative image of adaptable multi-fiber material.

Figure 3A:
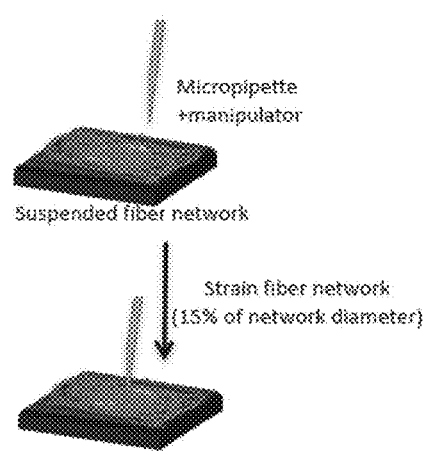
FIGS. 3A-3D illustrates microscopic fiber-fiber bonding and residual alignment in adaptable fibers.
Figure 3B:
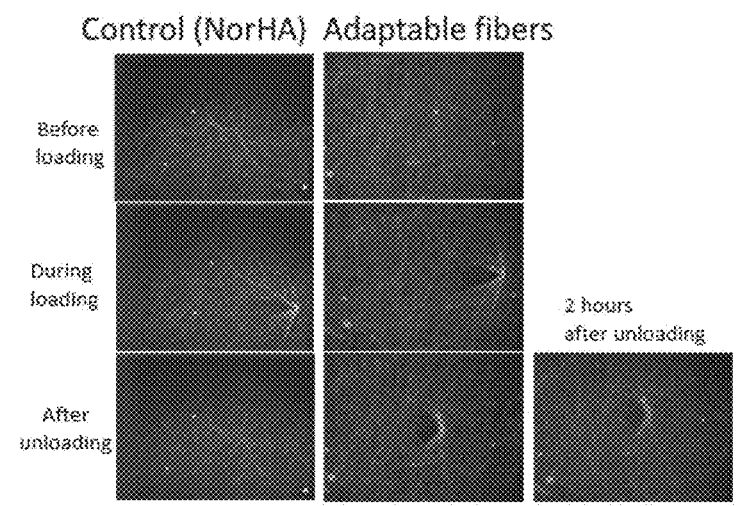
Figure 3C:
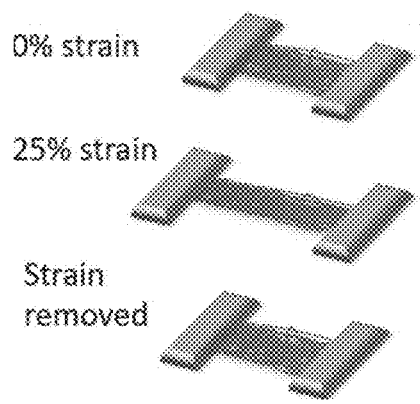
Figure 3D:
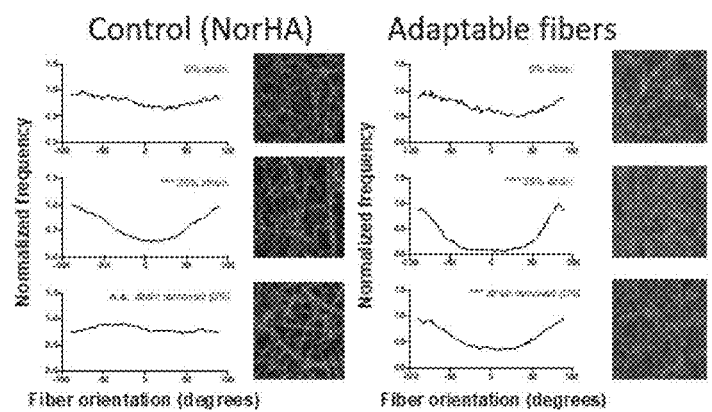

FIGS. 3A-3D illustrates microscopic fiber-fiber bonding and residual alignment in adaptable fibers. FIG. 3A Schematic of suspended fiber network and micromanipulator/micropipette-mediated straining experiment. FIG. 3B Snap shots of control (NorHA, left) and adaptable fiber (right) networks before (top), during (middle) and after loading (bottom) with micropipette. Fiber network remodeling was sustained for 2 hours after remodeling with manipulator (bottom right). FIG. 3C Schematic of fiber mat straining experiment on microscope and FIG. 3D fiber network fiber orientation with representative images of before (top) during (middle) and after (bottom) straining fiber mats.

FIGS. 4A-4C illustrate that residual fiber alignment directs cell orientation in adaptable fibers after straining. FIG. 4A Schematic of fiber straining and subsequent seeding of cells experiment. FIG. 4B Representative image of cell alignment on control fiber mats that had previously been strained and quantification of cell alignment below. FIG. 4C Representative image of cell alignment on adaptable fiber mats that had previously been strained and quantification of cell alignment below.

Figure 5A:
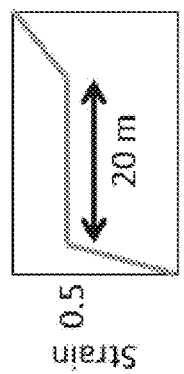
FIGS. 5A-5F illustrate that tuning adaptable fiber chemistry alters strain induced stiffening response.
Figure 5B:
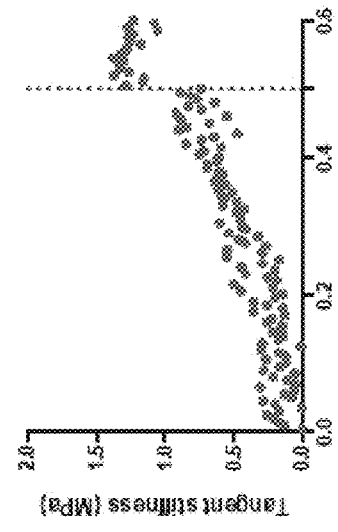
Figure 5C:
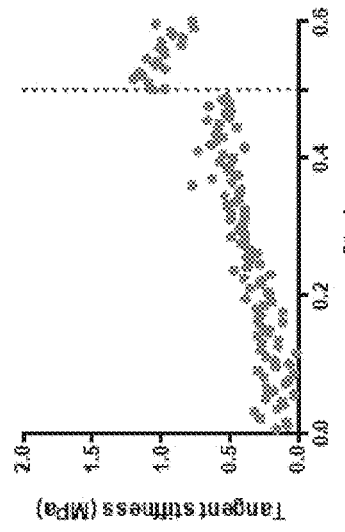
Figure 5D:
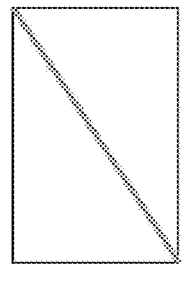
Figure 5E:
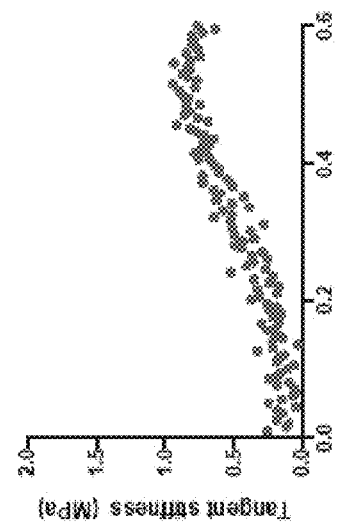
Figure 5F:
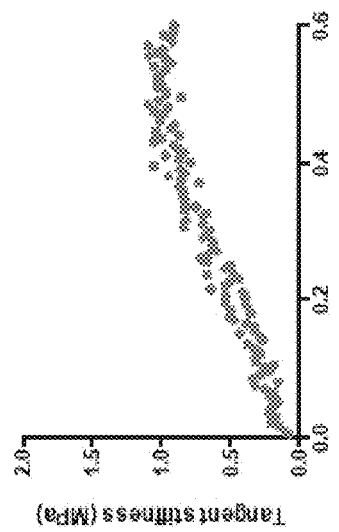

FIGS. 5A-5F illustrate that tuning adaptable fiber chemistry alters strain induced stiffening response. FIGS. 5A-5B Schematics of tensile straining experiments without FIG. 5A and with holding at 50% strain FIG. 5B, and subsequent loading to failure. FIG. 5C-5F Fiber mats were strained and forces were measured on an Instron tensile testing machine with a 5N load cell. FIG. 5C Tangent modulus of adaptable fiber mats strained to failure or FIG. 5D loaded to 50% strain, held for 20 minutes, and then loaded to failure. The line indicates point where material was held at 50% strain. FIG. 5E Tangent modulus of adaptable fiber mats with diluted hydrazide fibers (50% less adaptable bonds) strained to failure or FIG. 5F loaded to 50% strain, held for 20 minutes, and then loaded to failure. The line indicates point where material was held at 50% strain.

FIGS. 6A-6D illustrate the adaptable chemistry enhances adhesion strength of fiber mats. FIG. 6A Schematic of setup for measuring adhesion between layers of fiber mats. FIG. 6B Representative images of tensile testing experiments to measure adhesion strength with overlapped fiber mats. Top shows percent of strain in the image. FIG. 6C Representative stress strain curves from adhesion strength experiments and FIG. 6D average adhesion strength with control and adaptable fibers.

FIGS. 7A-7C illustrate the self-adhesion of adaptable multi-fiber system. FIG. 7A Schematic of mechanical compaction of fibrous materials to enable self-adhesion between layers of the fibrous sheet. When different layers of the fibrous material contact one another, new bonds form, which gives the material a self-adhesive property. Hydrazone bond formation is shown as an example. FIG. 7B Electrospun fiber mats composed of the adaptable fibers shown in FIG. 2A-2C, or control fiber mats that do not contain hydrazides were rolled around a needle as in FIG. 7A, hydrated, removed from the needle and agitated in saline solution. FIG. 7C The same fiber mats used in FIG. 7B were twisted 360 degrees 10 times, and then hydrated and agitated in saline solution. Microscopic images of adaptable (top) and control (bottom) fiber mats after agitation.

Figures 8A, 8B, 8C, 8D:
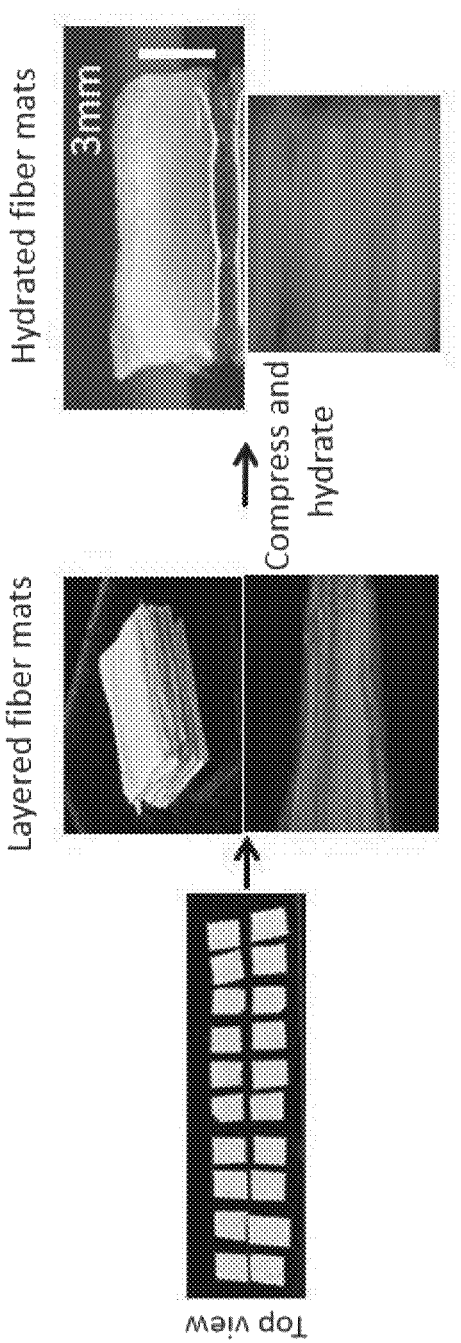
FIGS. 8A-8D illustrates that the fabrication of stable layered fiber mat structures is enabled by self-adhesion.

FIGS. 8A-8D illustrates that the fabrication of stable layered fiber mat structures is enabled by self-adhesion. FIG. 8a 20 pieces of fiber mat were FIG. 8B layered and then compressed and FIG. 8C hydrated in saline solution. FIG. 8D Image of hydrated fiber mat showing stability of shape while under mechanical agitation with stir bar stirring at 500 rpm in saline solution.

FIGS. 9A-9C illustrate mechanochemical interactions in multi-fiber hydrogel networks through the reaction of complementary chemical groups. FIG. 9A Schematic of the electrospinning of two fiber populations from hyaluronic acid modified with norbornenes (NorHA), as well as either hydrazides (NorHA-Hyd) or aldehydes (NorHA-Ald). Norbornenes are used for intra-fiber and inter-fiber crosslinking through a photoinitiated thiol-ene reaction to stabilize the fiber, while the hydrazides and aldehyde groups permit additional inter-fiber reactions when fibers are brought into contact. Inset shows hydrazide and aldehyde groups exposed on fiber surface after electrospinning, stabilization, and hydration. FIG. 9B Schematic (top) and fluorescent images (bottom) of mechanical strain-induced interactions between hydrazide and aldehyde containing NorHA fibers (i) before, (ii) during, and (iii) after applying strain for 40 minutes. After removal of strain, permanent deformations of "adhesive" fibers are observed through fluorescent microscopy. FIG. 9C Schematic (top) and fluorescent images (bottom) indicating a lack of mechanical strain-induced interactions in "non-adhesive" fiber control under the same loading conditions. The multi-fiber hydrogel control is fabricated from mixed fibers of unmodified NorHA and NorHA-Ald fiber populations, where no chemical reaction is expected when the fibers contact each other. Scale bar is 100 µm.

Figure 10B:
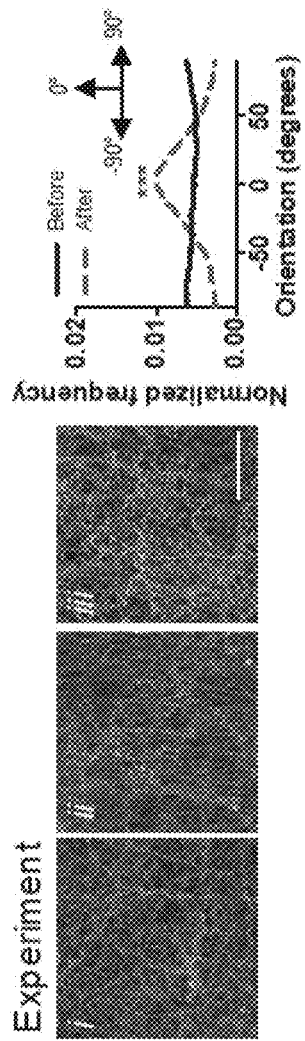
FIGS. 10A-10C illustrate strain-induced changes in fiber orientation in multi-fiber hydrogel networks.
Figure 10C:
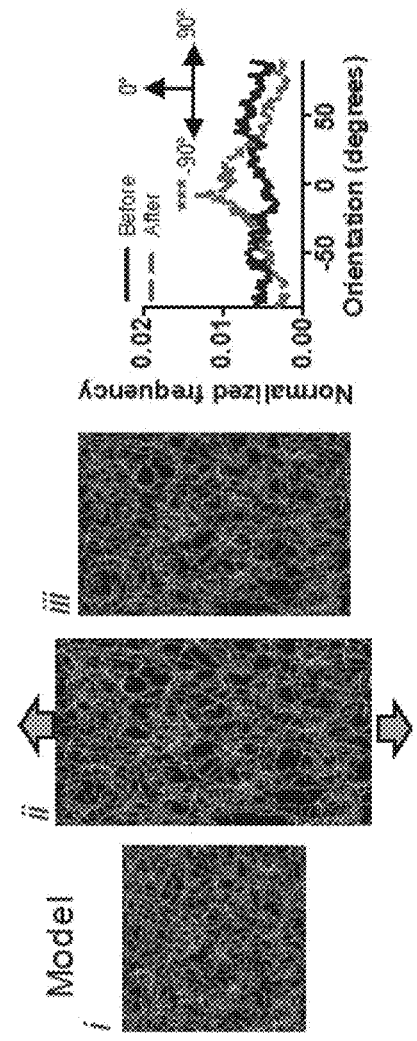
Figure 10A:
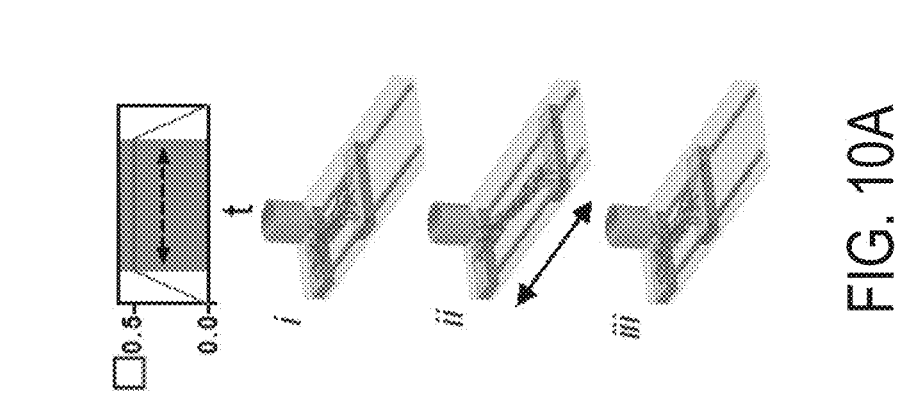

FIGS. 10A-10C illustrate strain-induced changes in fiber orientation in multi-fiber hydrogel networks. FIG. 10A Schematic of the experimental device to strain fibrous hydrogel networks, where clamped samples were strained 50%, held for 1 hour, and the strain removed. FIG. 10B Left: representative confocal images of adhesive fibers (i) before straining, (ii) while strained, and (iii) after strain removal. Right: normalized frequency of fiber orientations before and after straining (flat line indicates no orientation, whereas the presence of a peak indicates orientation at that angle). FIG. 10C Left: fiber network model of adhesive fibers (i) before straining, (ii) while strained, and (iii) after strain removal. Right: normalized frequency of fiber orientations before and after straining. Scale bar is 50 µm, ***$p \leq 0.001$.

Figure 11B:
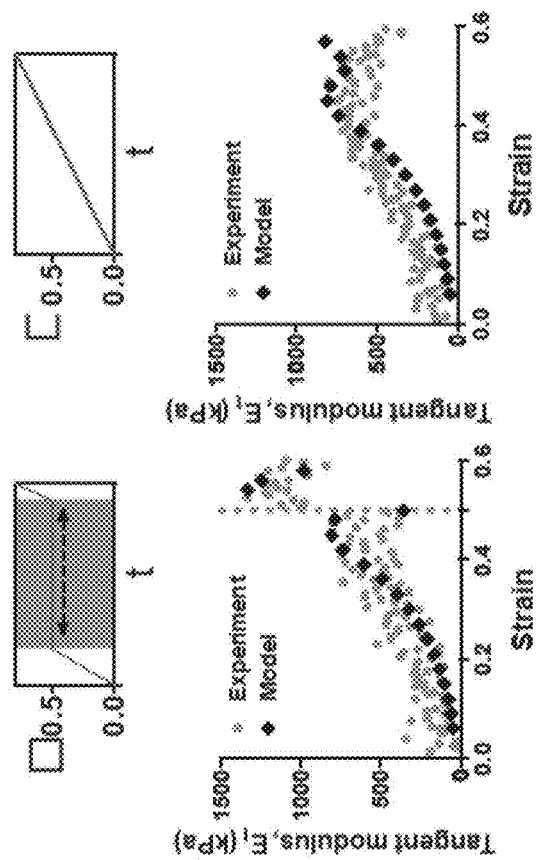
FIGS. 11A-11B illustrate strain-induced changes in adhesive fiber properties.
Figure 11A:
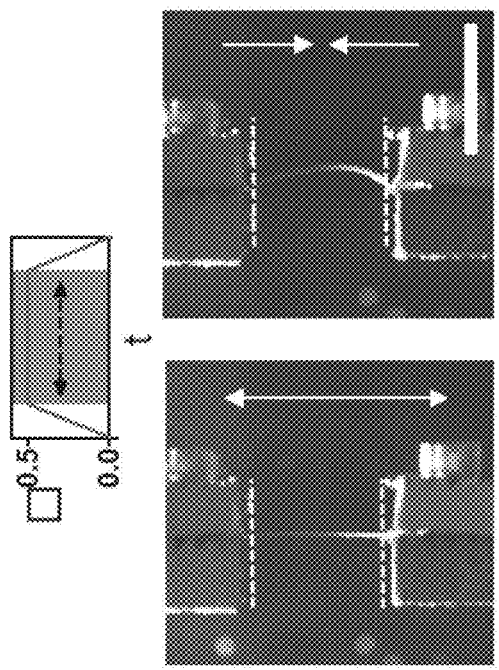

FIGS. 11A-11B illustrate strain-induced changes in adhesive fiber properties. FIG. 11A Adhesive fibers were strained to 50%, held for 10 minutes, and then strain removed. Images of the sample from the side before straining (left) and after strain removal (right). FIG. 11B Representative plot of the experimental tangent modulus ($E_t$) (circles) from adhesive fibers strained with holding at 50% strain (left) or without holding (right). Plots also include results of $E_t$ determined through a continuum model simulation of these loading conditions (diamonds). Scale bar is 15 mm.

FIGS. 12A-12D illustrate interfacial bonding with adhesive fibers. FIG. 12A Schematic of interfacial bonding between layers of adhesive fibers assessed with tensile loading. FIG. 12B Representative stress strain curves during interfacial adhesion testing (top) and average adhesive strength (bottom) of non-adhesive, adhesive, and adhesive fibers that have been re-adhered after one cycle of adhering and breaking adhesion. FIG. 12C Representative stress strain curves during interfacial adhesion testing (top) and average adhesive strength (bottom) of adhesive fibers with low hydrazide concentration (20% of original hydrazide) and adhesive fibers from panel FIG. 12B for comparison. FIG. 12D Representative stress strain curves during interfacial adhesion testing (top) and average adhesive strength (bottom) of aligned adhesive fibers, and adhesive fibers from panel FIG. 12B for comparison. One-way ANOVA and Tukey post hoc test across all conditions was used to test for significance. *, , ** represent $p \leq 0.05$, $p \leq 0.01$, $p \leq 0.0001$.

FIGS. 13A-13C illustrate macroscale structure fabrication with inter-fiber and interfacial bonding in adhesive fibers. FIG. 13A Adhesive fibers were twisted into helical structures, hydrated and mechanically agitated to show maintenance of the folded helical structure at (i) low magnification (scale bar is 10 mm) and (ii) high magnification (scale bar is 2 mm). FIG. 13B Layered adhesive fibrous networks (shown with 20 layers) laminated into a thick construct, and visualized (i) after hydration and mechanical agitation (scale bar is 3 mm) and (ii) with fluorescence microscopy to examine interlamellar layers (scale bar is 0.5 mm). FIG. 13C Luminal structures fabricated with adhesive fibers by wrapping around a needle and visualized (i) during removal from the support needle and (ii) while extruding 70 kDa rhodamine labeled dextran (scale bar is 20 mm). Fibers were illuminated with ultraviolet light to enhance visualization (a (i), and c (i, ii)).

Figures 14A, 14B, 14C, 14D:
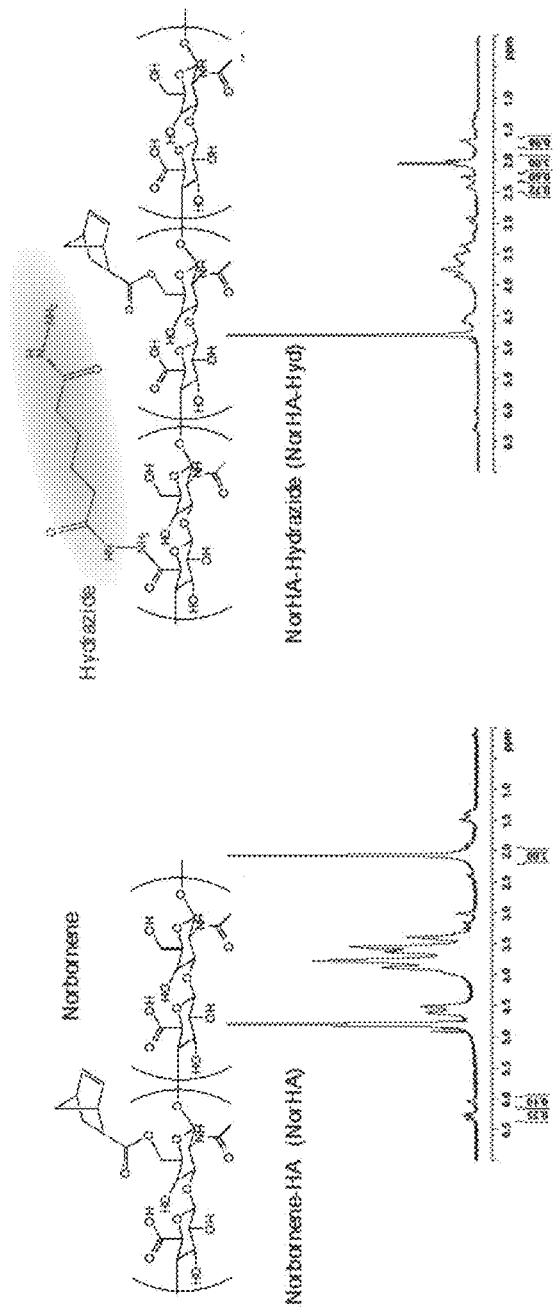
FIGS. 14A-14D illustrate $^1$H NMR characterization of modified HA and quantification of aldehyde modification.

FIGS. 14A-14D illustrate $^1$H NMR characterization of modified HA and quantification of aldehyde modification. FIG. 14A Norbornene modification (~17%) of HA was determined by integration of the vinyl peaks (2H) relative to methyl group of HA (3H, shaded). FIG. 14B Hydrazide modification (~29%) of NorHA was determined by integration of the butyl linker (8H) relative to methyl group of HA (3H, shaded). FIG. 14C Norbornene modification (~33%) of high molecular weight HA was determined by integration of the vinyl peaks (2H) relative to methyl group of HA (3H, shaded). FIG. 14D Concentration of aldehydes in a 2 wt % solution of HA oxidized with increasing amounts of sodium periodate. A 1:4 (Sodium periodate:HA) ratio was used throughout this work as previously described.

Figure 15A:
FIGS. 15A-15B illustrate carbon-13 NMR characterization of HA modified with norbornene and aldehyde groups.
Figure 15B:
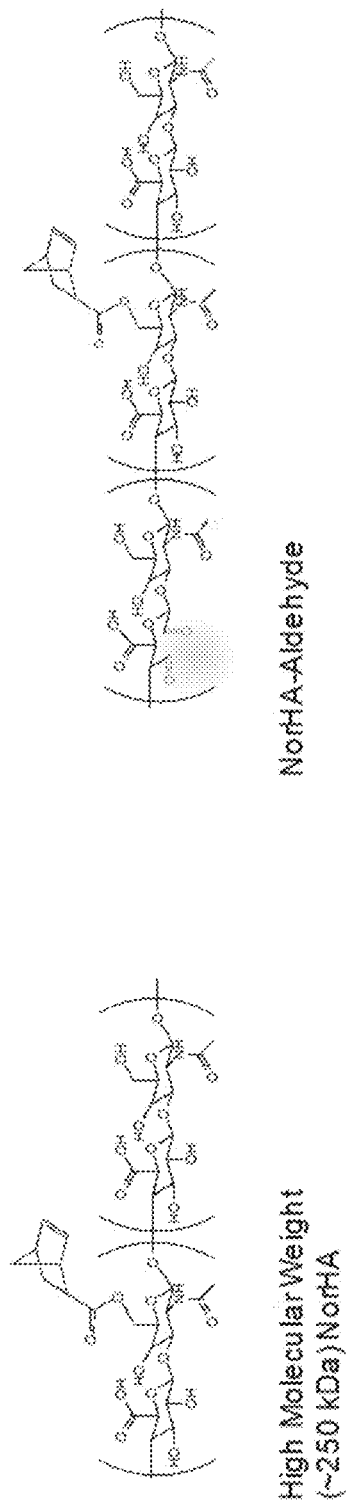

FIGS. 15A-15B illustrate carbon-13 NMR characterization of HA modified with norbornene and aldehyde groups. FIG. 15A Only β-D-glucoronic acid units of HA (~180) were observed in norbornene modified HA (NorHA), while, FIG. 15A aldehyde modification of NorHA was confirmed with the appearance of carbonyl peaks (>200 ppm, green).

FIGS. 16A-16B illustrate fabrication of adhesive and non-adhesive multi-fibrous hydrogel networks. FIG. 16A Adhesive fibers were fabricated with NorHA-Hyd and NorHA-Ald via multi-fiber electrospinning. Image shows representative confocal microscopy of hydrated adhesive fibrous hydrogel network. FIG. 16B Non-adhesive fibers were fabricated with NorHA and NorHA-Ald via multi-fiber electrospinning. Image shows representative confocal microscopy (converted to gray-scale) of hydrated non-adhesive fibrous hydrogel network. Scale bar is 10 µm.

Figure 17A:
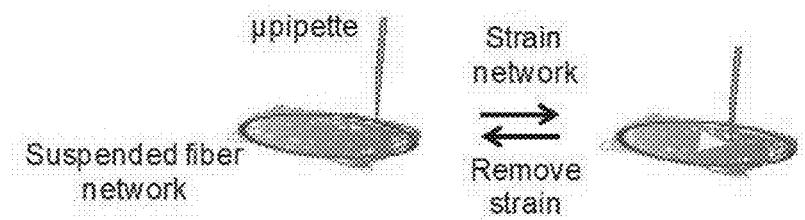
FIGS. 17A-17B illustrate design and manipulation of suspended fibrous hydrogel networks to assess inter-fiber adhesion and kinetics.
Figure 17B:
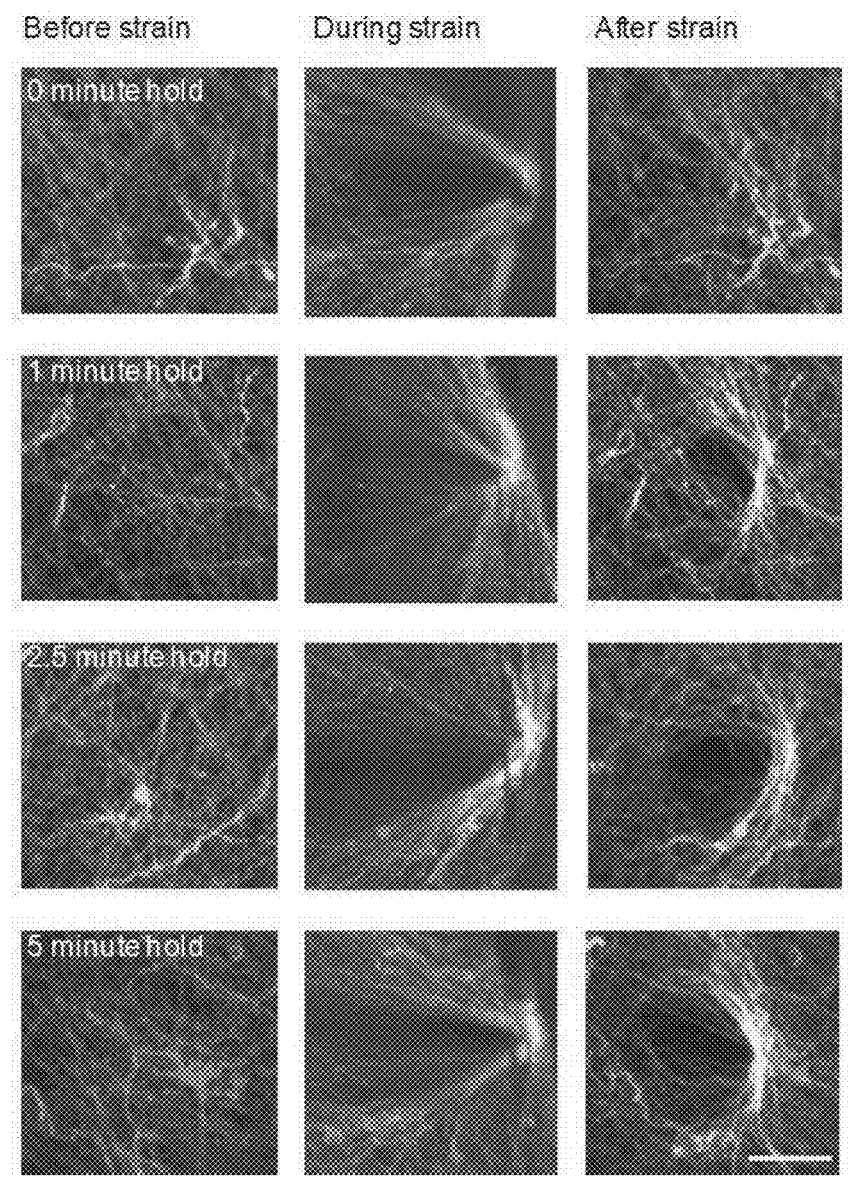

FIGS. 17A-17B illustrate design and manipulation of suspended fibrous hydrogel networks to assess inter-fiber adhesion and kinetics. FIG. 17A Schematic of technique used where suspended fibers are compressed with a micropipette (~5 µm diameter bore size) by inserting the tip into the network and translating the tip 300 µm and holding for various amounts of time and then translating the tip back to its original position. FIG. 17B Images of suspended fibers before, during, and after compressive strain through manipulator for various holding times to assess the influence of this time on inter-fiber adhesion and plastic deformation. Scale bar is 50 µm.

Figure 18A:
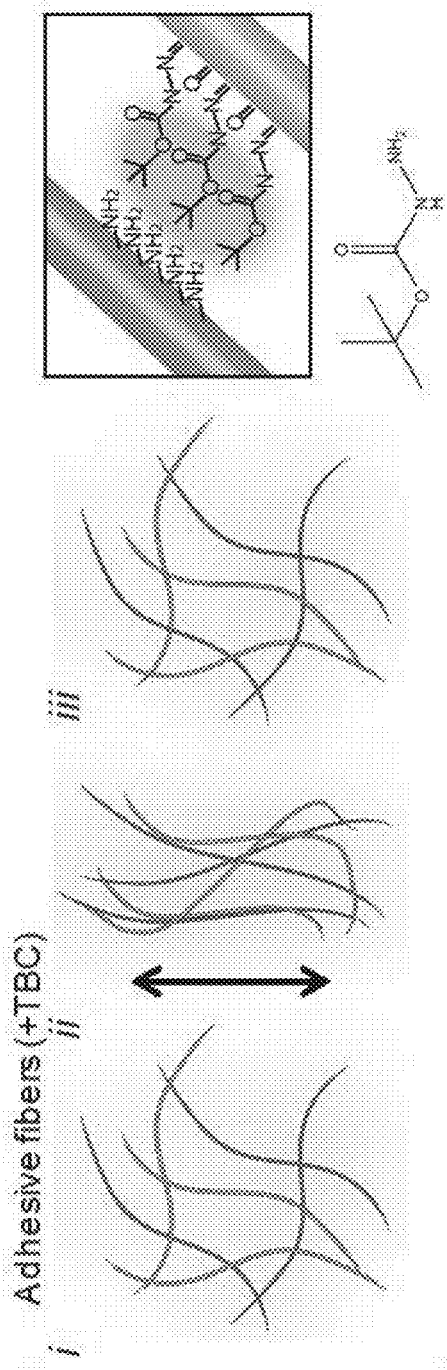
FIGS. 18A-18B illustrate blocking hydrazone bond formation prevents inter-fiber adhesion.
Figure 18B:
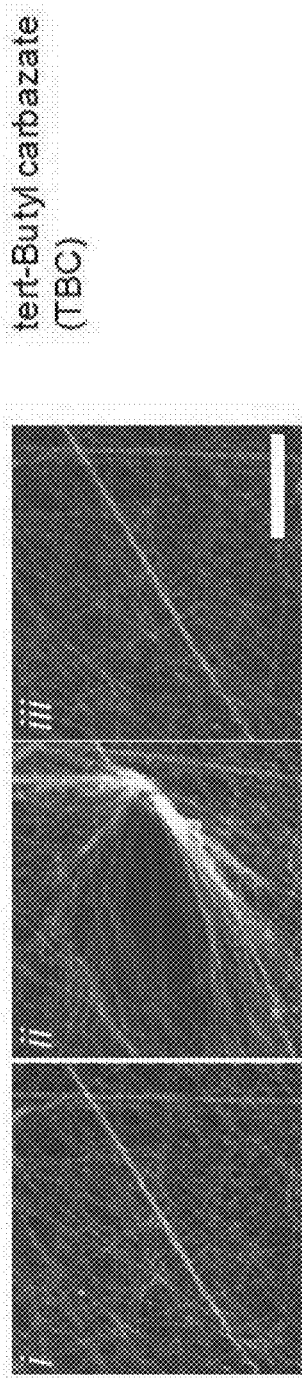

FIGS. 18A-18B illustrate blocking hydrazone bond formation prevents inter-fiber adhesion. FIG. 18A Aldehyde groups on adhesive fibers have a high affinity for tert-butyl carbazate (TBC). Hydrating fibers in a solution of TBC (50 mM) leads to deactivation of aldehydes preventing adhesion between fibers when in contact under strain. FIG. 18B Representative images of adhesive fibers (I) before, (II) during, and (III) after compression with manipulator after hydration in TBC. Scale bar is 100 µm.

Figure 19:
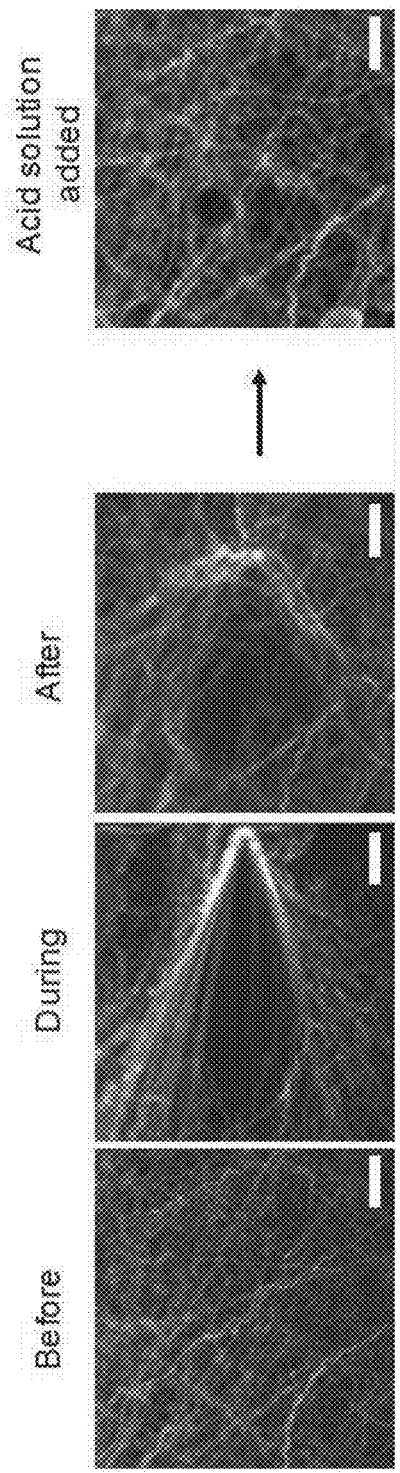
FIG. 19 illustrates disrupting hydrazone bonds by lowering pH. Suspended fibers were plastically compressed using a micromanipulator, and then plastic remodeling was rapidly disrupted by lowering pH with acetate buffer (pH 4.3). Scale bar is 50 μm.

FIG. 19 illustrates disrupting hydrazone bonds by lowering pH. Suspended fibers were plastically compressed using a micromanipulator, and then plastic remodeling was rapidly disrupted by lowering pH with acetate buffer (pH 4.3). Scale bar is 50 µm.

Figure 20A:
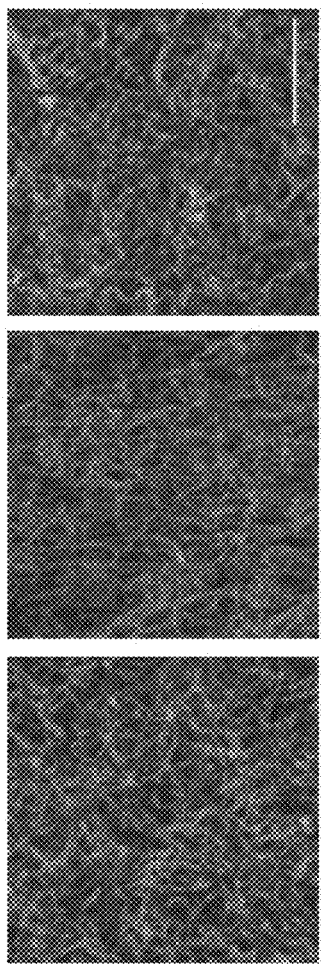
FIGS. 20A-20B illustrate that non-adhesive fibers lack strain responsive changes in fiber orientation.
Figure 20B:
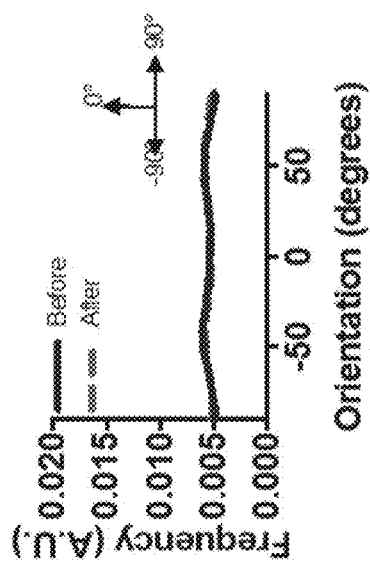

FIGS. 20A-20B illustrate that non-adhesive fibers lack strain responsive changes in fiber orientation. FIG. 20A Representative confocal images of non-adhesive fibers before (left), during (middle) and after removing strain (right). FIG. 20B Orientation of fibers before and after straining and holding for 1 hour before removing strain. Scale bar is 50 µm.

Figure 21A:
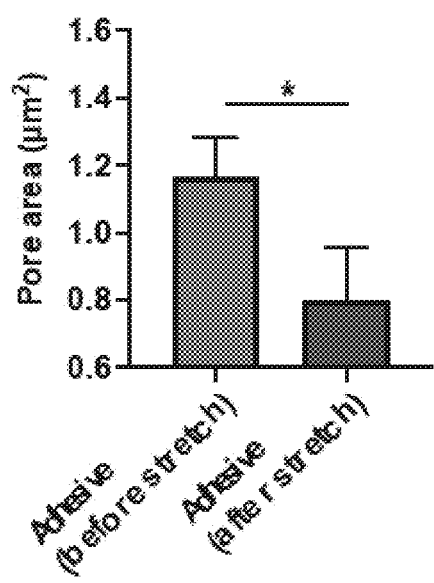
FIGS. 21A-21B illustrate the effects of strain on porosity in adhesive and non-adhesive fibers. Images from the experiments described in the text where fibrous hydrogels were strained, held, and then strain was removed, were used to assess changes in porosity due to straining FIG. 21A adhesive and FIG. 21B non-adhesive fibrous hydrogels. * represents p≤0.05.
Figure 21B:
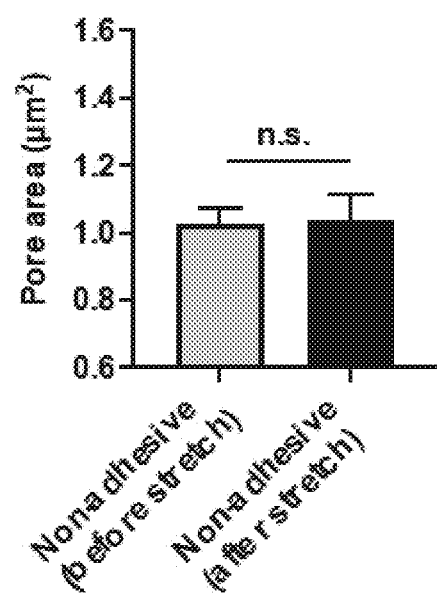

FIGS. 21A-21B illustrate the effects of strain on porosity in adhesive and non-adhesive fibers. Images from the experiments described in the text where fibrous hydrogels were strained, held, and then strain was removed, were used to assess changes in porosity due to straining FIG. 21A adhesive and FIG. 21B non-adhesive fibrous hydrogels. * represents $p \leq 0.05$.

Figure 22B:
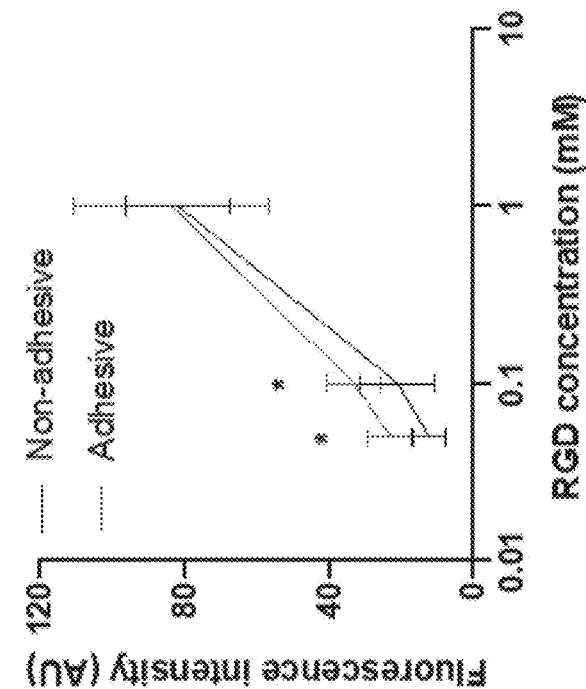
FIGS. 22A-22B provide characterization of RGD conjugation to fibrous hydrogel networks.
Figure 22A:
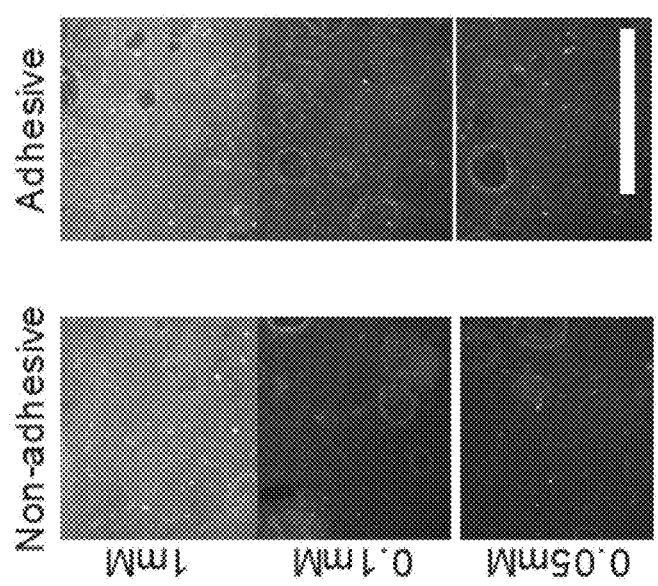

FIGS. 22A-22B provide characterization of RGD conjugation to fibrous hydrogel networks. FIG. 22A Rhodamine B-RGD peptides (0.05 mM-1 mM) and photoinitiator were incubated with non-adhesive (left) or adhesive (right) fibrous hydrogel networks, and conjugated to norbornene groups on HA through a photoinitiated thiol-ene reaction (5 mW/cm$^2$, 5 min). FIG. 22B Fluorescence intensity was quantified and used as a marker of RGD labeling efficiency. Scale is 500 µm. * represents $p \leq 0.05$.

Figure 23B:
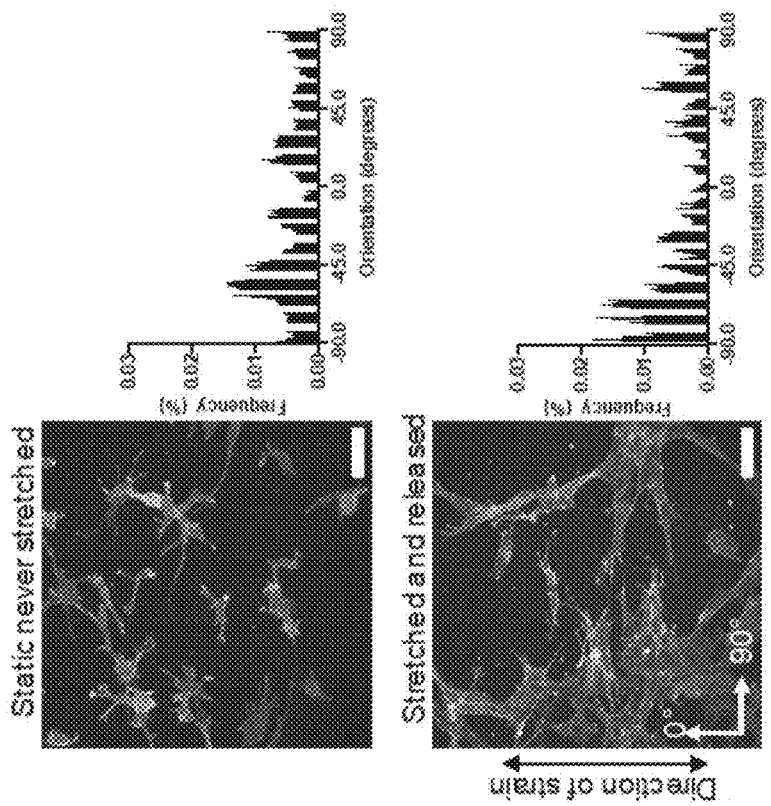
FIGS. 23A-23B illustrate stretching and releasing of cell laden fibrous hydrogels.
Figure 23A:
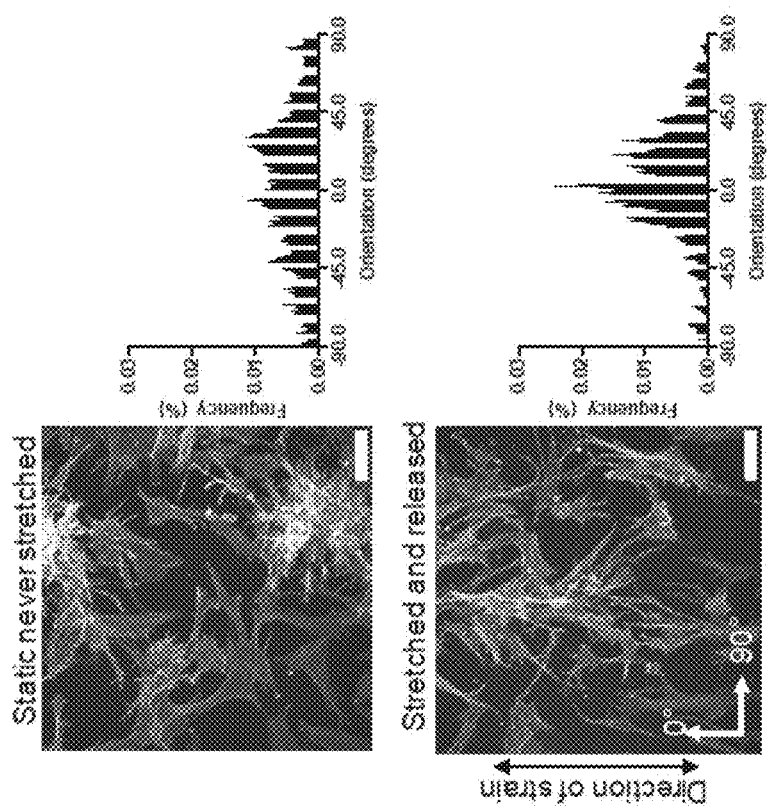

FIGS. 23A-23B illustrate stretching and releasing of cell laden fibrous hydrogels. FIG. 23A Adhesive and FIG. 23B non-adhesive fibrous hydrogels were conjugated with RGD, and then seeded with MSCs. After 4 hours, substrates were either (top) cultured statically for 24 hours without stretching or (bottom) strained to 50%, held for 1 hour, and then the strain was released and cells were cultured for 24 hours. After 24 hours, cultures were fixed, stained for f-actin and DNA, and imaged using a confocal microscope. Cell orientation was quantified as actin orientation measured using OrientationJ in FIJI. Scale bar is 100 µm.

Figure 24B:
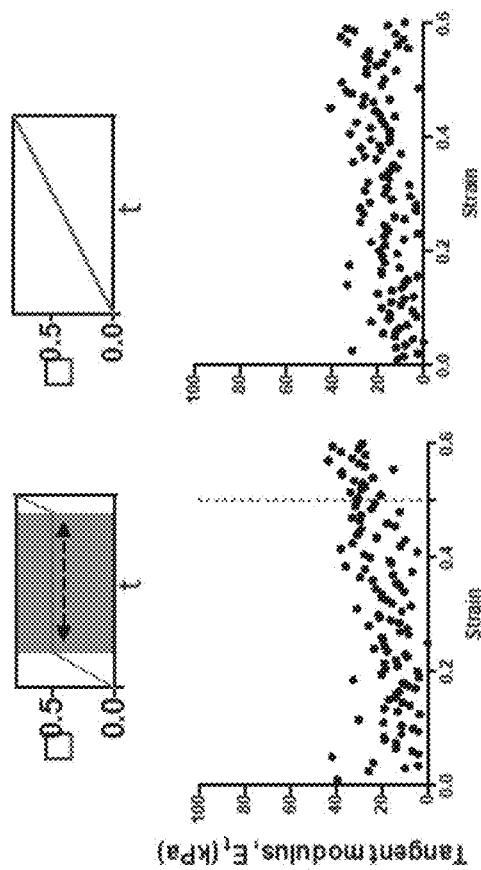
FIGS. 24A-24B illustrate that non-adhesive fibers lack strain responsive changes in mechanical properties.
Figure 24A:
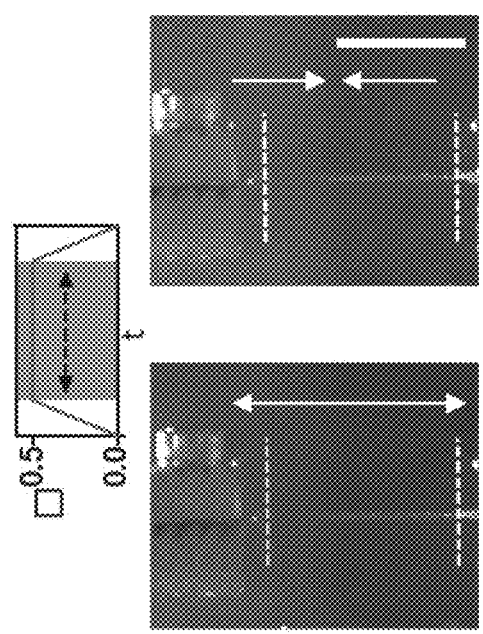

FIGS. 24A-24B illustrate that non-adhesive fibers lack strain responsive changes in mechanical properties. FIG. 24A Non-adhesive fibers were strained to 50% strain, held for 10 minutes and then returned to their original length and imaged from the side before (left) and after (right) straining and holding. Scale bar is 15 mm. FIG. 24B Representative plots of tangent stiffness from non-adhesive fibers strained with holding at 50% strain (right) or without holding (left).

Figures 25A, 25B:
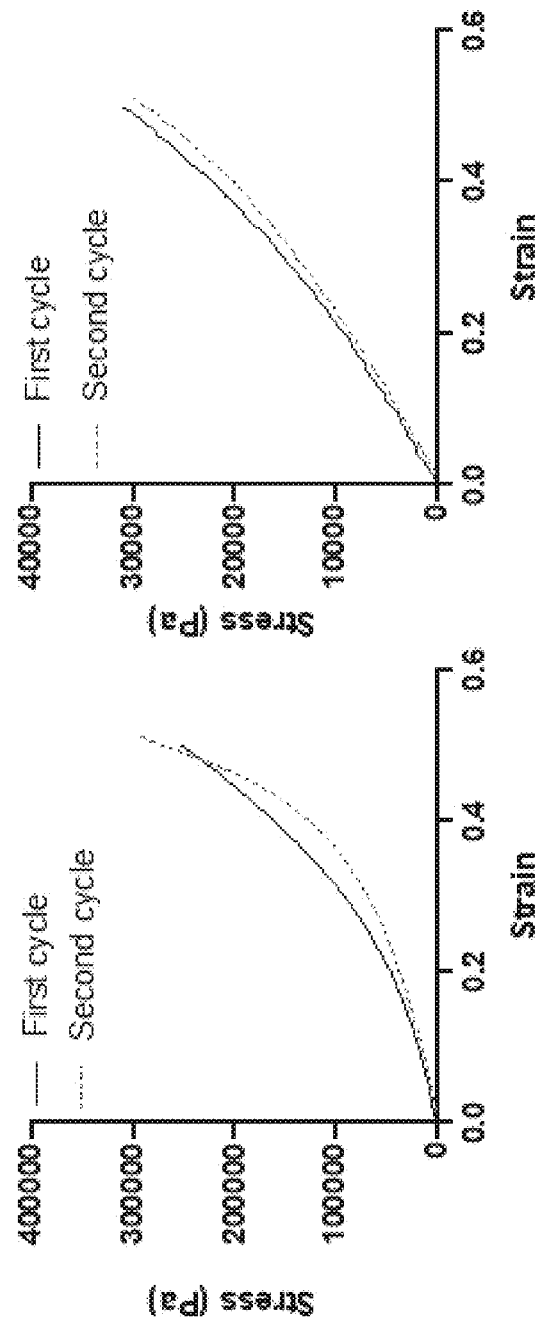
FIGS. 25A-25B illustrate cyclic loading of fibrous hydrogels.

FIGS. 25A-25B illustrate cyclic loading of fibrous hydrogels. FIG. 25A Adhesive and FIG. 25B non-adhesive fibrous hydrogels were loaded in tension to 50% strain, unloaded, and then loaded again to 50% strain.

FIGS. 26A-26C illustrate the effects of microscale anisotropy and hydrazone bonds on fibrous hydrogel mechanics. FIG. 26A Aligned and non-aligned adhesive fibers (top) were fabricated and alignment was quantified from images (bottom). FIG. 26B Stress-strain curves of adhesive aligned (dotted), adhesive non-aligned (solid), and non-adhesive fibers strained in tension to failure, and FIG. 26C Young's moduli calculated at 5-15% strain. Scale bar is 20 μm. , ** represent $p \leq 0.01$, $p \leq 0.0001$.

Figure 27:
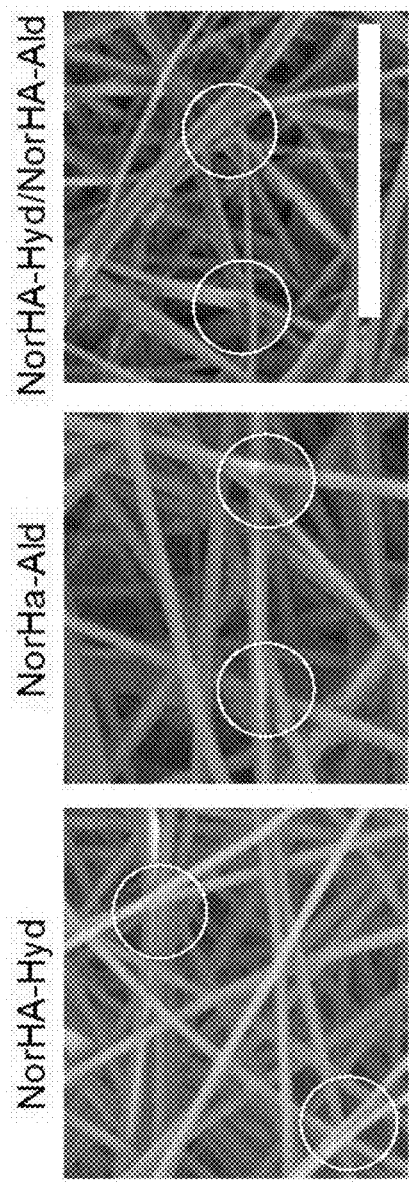
FIG. 27 provides a scanning electron microscopy (SEM) characterization of fiber topography and inter-fiber welding. (a) NorHA-Hyd, (b) NorHA-Ald, and (c) a mixed population of NorHA-Hyd and NorHA-Ald were electrospun and photocrosslinked prior to SEM imaging in the non-hydrated state. White circles outline areas of inter-fiber welding. Scale bar is 5 µm.

FIG. 27 provides a scanning electron microscopy (SEM) characterization of fiber topography and inter-fiber welding. (a) NorHA-Hyd, (b) NorHA-Ald, and (c) a mixed population of NorHA-Hyd and NorHA-Ald were electrospun and photocrosslinked prior to SEM imaging in the non-hydrated state. White circles outline areas of inter-fiber welding. Scale bar is 5 μm.

Figure 28A:
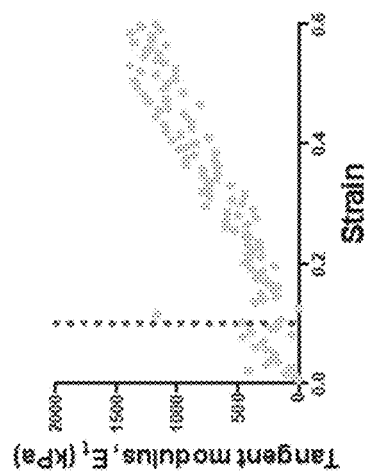
FIGS. 28A-28C illustrates that adhesive fibers do not undergo strain-induced stiffening at strains below 50%. Representative tangent modulus plots of adhesive fibers strained with holding for 20 minutes at FIG. 28A 10%, FIG. 28B 20%, or FIG. 28C 30% strain. Red line indicates strain where holding occurred.
Figure 28B:
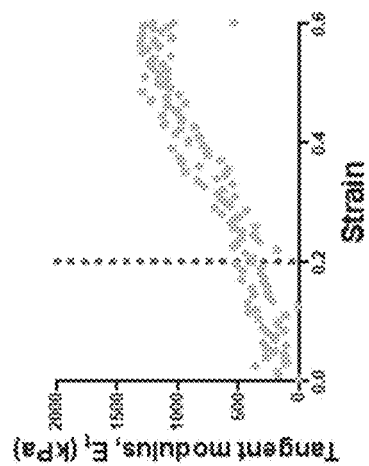
Figure 28C:
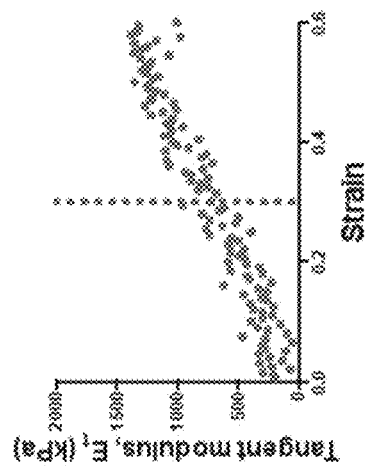

FIGS. 28A-28C illustrates that adhesive fibers do not undergo strain-induced stiffening at strains below 50%. Representative tangent modulus plots of adhesive fibers strained with holding for 20 minutes at FIG. 28A 10%, FIG. 28B 20%, or FIG. 28C 30% strain. The line indicates strain where holding occurred.

Figures 29A, 29B:
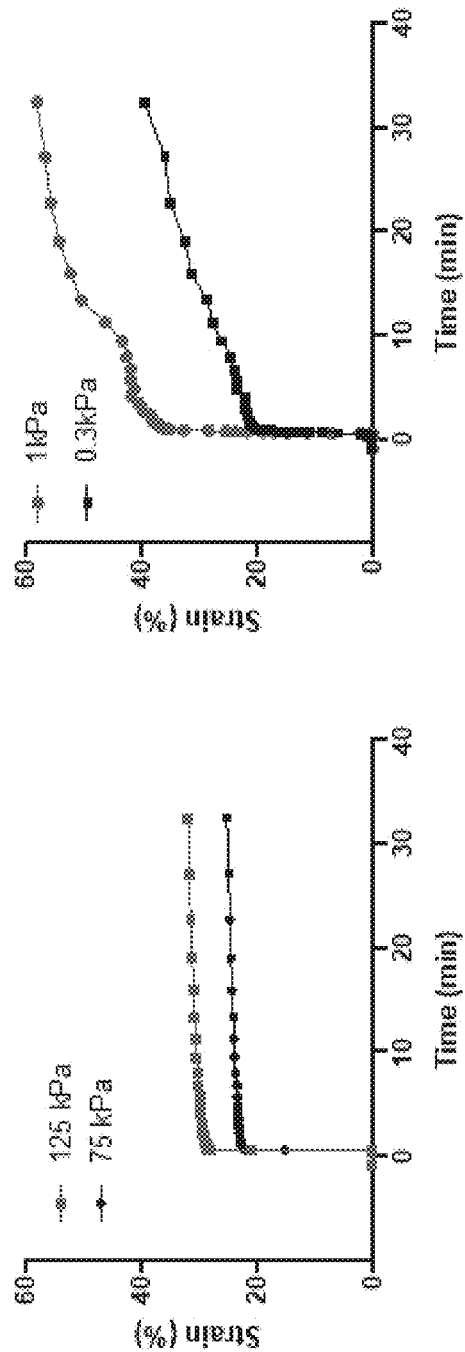
FIGS. 29A-29B illustrate extended creep testing of adhesive and non-adhesive fibrous hydrogels. Materials were hydrated, equilibrated at room temperature, and then exposed to creep testing for 30 minutes.

FIGS. 29A-29B illustrate extended creep testing of adhesive and non-adhesive fibrous hydrogels. Materials were hydrated, equilibrated at room temperature, and then exposed to creep testing for 30 minutes. FIG. 29A adhesive fibers were exposed to 75 kPa or 125 kPa of tensile stress, while FIG. 29B non-adhesive fibers were exposed to 0.3 kPa or 1 kPa of tensile stress.

Figure 30:
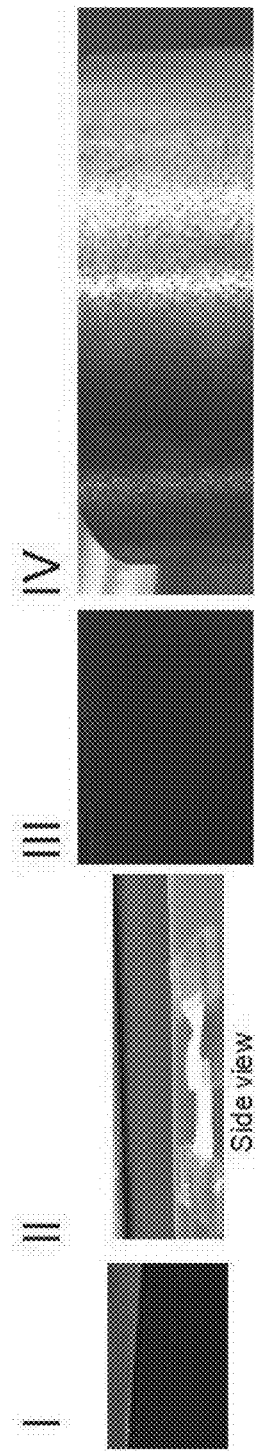
FIG. 30 illustrates sample preparation and treatment for self-adhesion test. (I) Dry fiber mats were cut and (II) overlapped and (III) compressed together and (IV) hydrated under compression for 20 minutes.

FIG. 30 illustrates sample preparation and treatment for self-adhesion test. (I) Dry fiber mats were cut and (II) overlapped and (III) compressed together and (IV) hydrated under compression for 20 minutes.

FIGS. 31A-31B illustrates that non-adhesive fibers do not retain macroscale shape with mechanical agitation. FIG. 31A (I) Non-adhesive fiber mats were (II) twisted into helical structure and (III) hydrated with mechanical agitation. (IV) Fluorescent micrograph of fiber mat after agitation. FIG. 31B Non-adhesive fibers were (I) wrapped around an 18 G needle and hydrated, and then (II) removed from the needle with forceps and (III) mechanically agitated with a stir bar.

Figure 32:
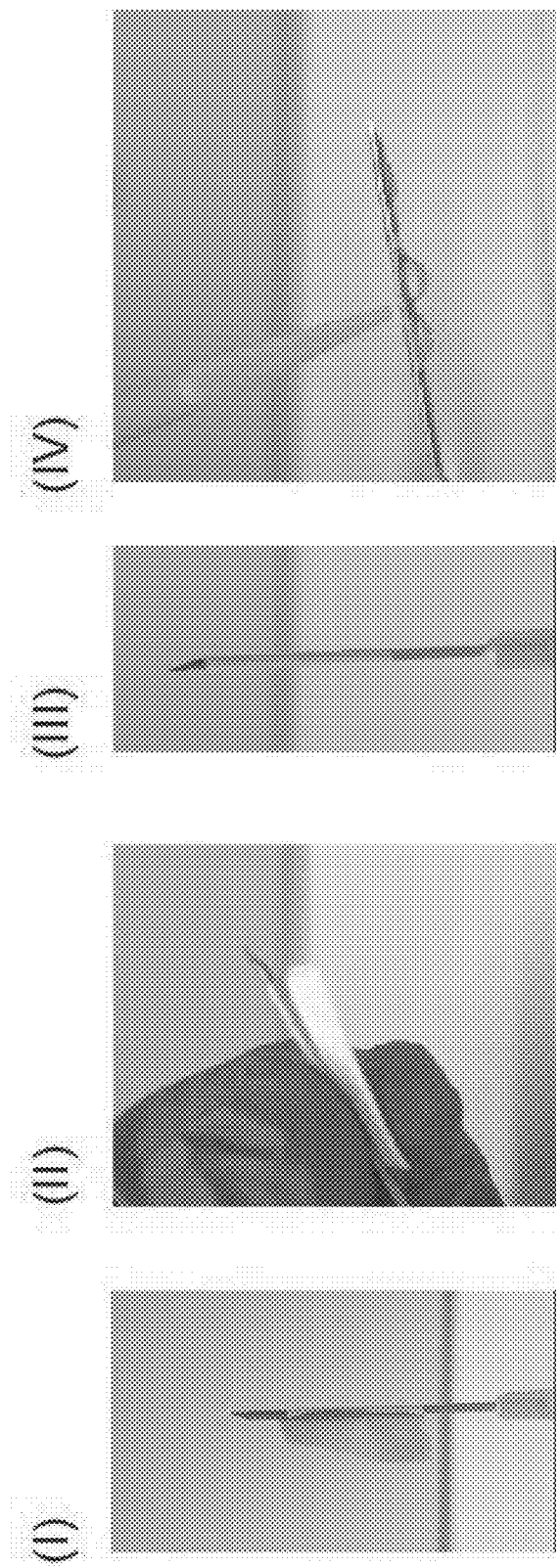
FIG. 32 illustrates a process for fabricating lumen structure with fiber mats. (I) Fiber mats are wrapped around an 18 G needle and then (II) manually rolled around the needle until (III) the entire mat is completely wrapped around the needle and then (IV) hydrated.

FIG. 32 illustrates a process for fabricating lumen structure with fiber mats. (I) Fiber mats are wrapped around an 18 G needle and then (II) manually rolled around the needle until (III) the entire mat is completely wrapped around the needle and then (IV) hydrated.

Figure 33:
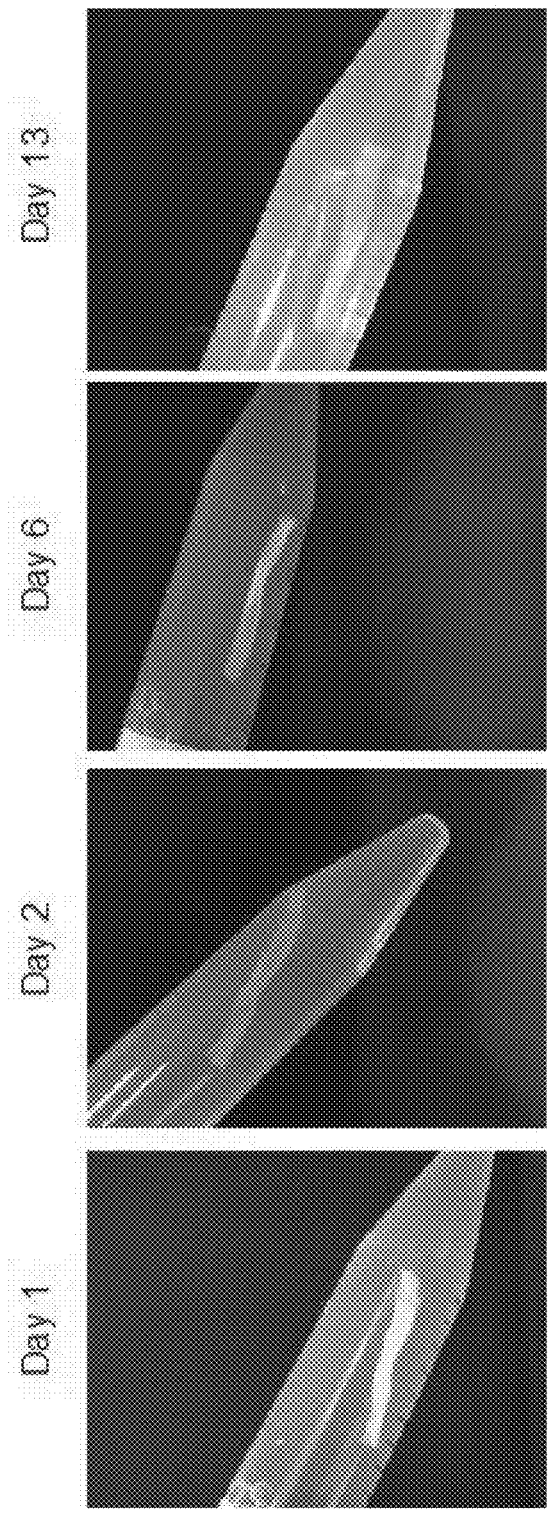
FIG. 33 illustrates the stability of adhesive fiber macroscale structure over time in cell culture media. Adhesive fibers were formed into a lumen structure, as described in the text, and then transferred into cell culture media and incubated at 37° C. for indicated time. Image shows same lumen structure over time.

FIG. 33 illustrates the stability of adhesive fiber macroscale structure over time in cell culture media. Adhesive fibers were formed into a lumen structure, as described in the text, and then transferred into cell culture media and incubated at 37° C. for indicated time. Image shows same lumen structure over time.

Adhesivity in fibrous materials can be utilized for adhering layers of materials together to build up thick and complex structures and for wrapping materials around structures and anchoring them in place through self-adhesion. Van der walls forces, hydrogen bonding and fiber entanglements form weak interactions between fibers and layers of fibrous materials and processing techniques can lead to the formation of welding between fibers.

The use of multi-fiber materials that contain chemical groups that can react when placed together—either when the material is loaded (such as in compression where fibers come into contact or tension where fiber alignment induces fiber interactions) or through a material with itself or between two materials, has not been achieved until the present disclosure.

Provided here is a new strategy for designing multi-fiber materials that can adapt their material properties and have self-adhesive properties by forming new bonds, or crosslinks, between fibers. One advance of this strategy is the combination of multi-fiber materials processed from polymers with, e.g., two or more different chemical groups that can react when fibers come into contact through mechanical manipulation (FIG. 1). One can term these materials adaptable fibers. Mechanical manipulation refers to straining, compressing or shearing materials.

When fibrous materials are mechanically manipulated, the fibrous architecture changes, and individual fibers buckle and stretch, which condenses the material and brings fibers into close contact. At these points of contact, using the material described here, chemical groups will form new bonds, and this will change the bulk material properties such as stiffness, and shape. This allows for the number of bonds within the material to be adjusted when the material is manipulated and gives the material a self-adhesive property since bonds can form between different layers of material that are brought into contact.

Briefly, polymers that can be fabricated into fibers are synthesized with two or more complementary chemical groups that react when placed together. As a non-limiting example, norbornene hyaluronic acid (NorHA) was modified with hydrazides and aldehydes, which are complementary chemical groups that can form covalent hydrazone bonds (FIG. 2). Various other complementary chemistries and combinations of complementary chemistries can be used. These polymers are processed into fibers through various techniques, e.g., using electrospinning, and mixed together to form multi-fiber materials. Mixed-polymer electrospinning was used to create a multi-fiber material (FIG. 2). Other methods for producing fibers and mixing fibers are discussed below and are also known to those of ordinary skill in the art.

As shown here, suspended adaptable fibers form bonds and stick to each other when the material is strained and fibers are pushed into contact, while control fibers composed of just NorHA, do not stick to each other (FIG. 3, 3A, 3B). Additionally, adaptable fibers that have been strained retain a significant amount of residual alignment after removing strain, while non-adaptable NorHA fibers do not retain residual alignment (FIG. 3, c and d). This residual alignment within the material can act as a topographical cue for cell orientation, as cells seeded on these strained adaptable fibers align in the previous axis of strain, while cells seeded on control fibers do not align in the previous axis of strain (FIG. 4).

These materials can be utilized to create adaptable textiles or biocompatible materials that change their properties when they are mechanically manipulated. This adaptability can prevent materials from failing prematurely. Adaptable fibers change their bulk stiffness in response to mechanical manipulation (FIG. 5, 5A).

As an example, if adaptable fibers are strained to 50% strain and held at this level of strain for 20 minutes, new crosslinks form and this leads to increased material tangent stiffness. By lowering the amount of adaptable bonds initially present in the material, one can make the material more extensible, which leads to more fiber-fiber interactions and higher levels of stiffening in response to strain (FIG. 5, 5B). The level of adaptable bonds can be tuned for different applications so the material only changes its material properties in response to certain thresholds in stress or strain.

Many fibrous materials currently used for biomedical applications are utilized to cover, wrap or seal tissues. This includes a plethora of synthetic, natural and hybrid materials, where the material is applied and anchored in place through glues or suturing techniques. Because the disclosed adaptable fiber strategy provides a self-adhesive material (FIG. 6), current fibrous materials utilized in the clinic can be modified to have this property and avoid the need for sutures and glues to anchor materials in place. As one example, adaptable fibers can be rolled and twisted into luminal and helical macroscopic shapes through their self-adhesion, and they hold these shapes over time with mechanical agitation, while control materials lose their weak adhesions and unravel back into planar fiber mats (FIG. 7). Thus, the disclosed materials can be wrapped around tissues and self sealed without the need for sutures or glues. Additionally, these materials can be further modified to also contain tissue adhesive chemical species to further promote sealing of tissues.

This material also allows for self-adhesion, which solves the problem of needing to suture or glue materials together for biomedical applications. In situations where tissues are damaged, but not severed, materials need to be wrapped around the tissue to support normal tissue shape and healing. Current existing products do not have self-adhesive properties, thus necessitating the use of sutures, external stimuli mediated crosslinking strategies, and glues which increase procedure time and complexity. An end user (e.g., a surgeon) can wrap this material around tissues/organs and fix the material in place by overlapping the material on itself, where its self-adhesive properties will form bonds that hold the material in place. Additionally, this material adapts to certain thresholds of mechanical manipulation by changing its mechanical properties, which facilitates material integration within tissues and prevent premature failure of materials. This approach can be used for many applications outside the biomedical space as well, really any place where textiles are used.

EXAMPLE IMPLEMENTATIONS

Although the provided examples of this multi-fiber complementary chemistry approach use multi-fiber electrospinning with aldehyde and hydrazide modified norbornene-hyaluronic acid, this approach can be expanded to many different polymers, chemistries, and fiber processing techniques.

Polymers

In one strategy, complementary chemistries are added to a polymer backbone. One or many different polymer backbones can be utilized, which include, but are not limited to: agarose, alginate, RGD-modified alginate, amylase, amylpectin, cellulose, chitosan, collagen, keratin, elastin, fibronectin, dextran, fibrin, gelatin, glycogen, heparin, hyaluronic acid, poly(acrylamide), poly(β-aminoester), poly (caprolactone), matrigel, multi-arm polyethylene glycol, poly-hydroxyethyl acrylate, poly(hydroxyethyl methacrylate), poly(N-isopropylacrylamide), poly(glycolic acid), poly(lactic acid), poly(lactic acid-glycolic acid), oligo(poly (ethylene glycol)fumarate), poly(vinyl alcohol), or a poly (vinyl acid).

Chemistries

As stated above, various complementary chemistries can be used in this strategy. These chemistries can be activated by an external stimulus such as light or enzymes; provided here is a listing of stand-alone chemistries that will form bonds if they are in close enough proximity and the environmental conditions, such as pH and temperature, are favorable. Additionally, different strengths of bonds such as strong covalent bonds or weaker dynamic bonds can be utilized. These chemistries can be used to modify one or many of the polymers mentioned above based on the application. Some of the covalent chemistries include, but are not limited to: acrylate, acrylamide, optionally protected alcohol, aldehyde, alkyne, optionally protected amine, anhydride, azide, carboxy, epoxy, ester, hydrazide, ketone, maleimide, methacrylate, styrenyl, optionally protected thiol, vinyl or vinyl sulfone group. The products of these chemical covalent crosslinking reactions are ester, ether, amide, hydrozone, polyacrylate, polymethacrylate, thioamide, thioester, thioether, or urethane.

With non-covalent chemistries, a coupled pair of host and guest moieties can be: alpha-cyclodextrin/hexyl group pair, an alpha-cyclodextrin/polyethylene oxide group pair, a beta-cyclodextrin/adamantane group pair, a beta-cyclodextrin/cyclohexyl group pair, a beta-cyclodextrin/benzyl group pair, a gamma-cyclodextrin/cyclodecyl group pair, a cucurbituril/hexanediamine group pair, or a cucurbituril/spermine group pair. Additionally, protein based complementary bonding can be utilized with docking and dimerization domain (rDDD), comprised of a dimer of RIIa cAMP dependent PKA recombinant protein, which links together by a hydrophilic peptide spacer containing integrin binding domains.

Fiber Processing

Fibers can be generated through various methods including, but not limited to: electrospinning, melt electrospinning, near field electrospinning, wet spinning, co-axial electrospinning, tri-axial electrospinning, magnetic assisted electrospinning, magneto mechanical drawing, electroblowing, melt blow fiber processes, rotary jet spinning, and microfluidic based fiber formation. Methods utilized for cotton, vegetable, animal, insect and synthetic fiber production for textiles.

Additional Disclosure

Further background can be found in "Mechanochemical Adhesion and Plasticity in Multi-fiber Hydrogel Networks," Davidson et al., *Advanced Materials*, vol. 32, issue 8, which publication is incorporated herein by reference in its entirety.

Natural biopolymers, such as those that comprise the fibrillar extracellular matrix (ECM), have force-responsive (i.e., mechanochemical) properties that allow tissues to adapt to mechanical load. Several strategies have been used to recapitulate such mechanochemical behavior in materials. For instance, strain-stiffening synthetic hydrogels have been engineered through the synthesis of polymers with semi-flexible backbones, which organize into a mesh-like architecture and mechanical loading induces polymer extension and packing. While these material systems capture some of the responsive properties of the ECM, they are inherently non-fibrous—importantly, it is the fibrous network structure and fiber stretching and buckling under mechanical load that allows network densification and inter-fiber interactions within the ECM.

The present disclosure provides a generalizable strategy to generate fibrous materials with mechanochemical and self-adhesive properties by combining dynamic covalent chemistry with multi-fiber electrospinning techniques. Synthetic fibrous materials can be engineered through techniques such as electrospinning, where material structure, biochemical composition, and heterogeneity can be tuned to mimic the ECM. Electrospun hydrogel fibers can be tailored to have single fiber stiffnesses within the range of ECM fibers and to undergo deformation under cellular tractions. In the disclosed approach, multi-fiber electrospinning is used to fabricate fibrous hydrogel networks, where commonly used complementary chemistries (e.g., aldehydes and hydrazides) are introduced into distinct fiber populations that are mixed within the same network of fibers (FIG. 9A). These fiber populations are separated from each other after fabrication; however, under mechanical load, the fibers are brought into close enough proximity (e.g., physical contact between fibers) so that a chemical reaction can occur (e.g., the formation of hydrazone bonds from the interaction of aldehydes and hydrazides) (FIG. 9B). This "adhesive" interaction alters the local fiber microstructure and can be used to bind adjacent materials together. Conventional, "non-adhesive" fibrous hydrogel networks of uniform composition or those that lack either of the reactive groups involved in these mechanochemical reactions do not exhibit these properties (FIG. 9Cc).

Electrospun fibers were fabricated from hyaluronic acid (HA) due to its biocompatibility and potential for chemical modification for hydrogel formation. HA was first modified with norbornenes (NorHA) through an anhydrous esterification reaction to couple norbornene carboxylic acid to HA. NorHA was then separately modified with either hydrazides (NorHA-Hyd) through an amidation reaction between adipic acid dihydrazide and carboxylic acids of HA or aldehydes (NorHA-Ald) through oxidation of NorHA with sodium periodate (FIGS. 14 and 15). NorHA, NorHA-Hyd, and NorHA-Ald could then be electrospun into swollen multi-fibrous materials (fibers of NorHA-Hyd and NorHA-Ald to form "adhesive" fibrous networks or fibers of NorHA and NorHA-Ald to form "non-adhesive" fibrous networks) via electrospinning, stabilization through photocrosslinking, and hydration (FIG. 16). Hydrazides and aldehydes were chosen as they undergo rapid Schiff Base reactions to form hydrazone bonds under physiological conditions and have been widely used to form dynamic hydrogels for biomedical applications. However, this approach can be used across a wide selection of chemistries, where combination induces chemical reactions (e.g., methacrylates and thiols via Michael Addition reactions, amines and aldehydes to form imine derivatives), where the selection of the chemical pairs will control the kinetics and strength of fiber interactions.

To examine their mechanochemical properties, the "adhesive" fibrous hydrogel networks were electrospun as suspended networks and the fibers were compressed using a micromanipulator and micropipette (FIG. 17). The micropipette compresses suspended fibers together to create points of contact, while the microscope permits simultaneous visualization of fluorescently-labeled fibers to evaluate either transient (i.e., reversible) or plastic (i.e., irreversible) deformation when the compressive forces are removed. When examined, plastic deformation was observed for the adhesive fibers within 1 minute and further increased after loading for up to 5 minutes (FIG. 17) and even up to 40 minutes (FIG. 9B). These kinetics are consistent with the reaction behavior of aldehydes and hydrazides to form hydrazone bonds as previously reported in hydrogel formation.[22,23] Importantly, this behavior was not observed in the non-adhesive fibers that did not possess the complementary bonds for reaction (FIG. 9C) or in the adhesive fibers that were treated with an aldehyde capping molecule (i.e., tert-butyl carbazate, TBC) to deactivate the aldehydes and prevent hydrazone bond formation (FIG. 18). To provide further evidence of hydrazone bond formation, plastic deformation was rapidly disrupted by lowering the pH with acetate buffer (pH 4.3), which disrupts the pH sensitive hydrazone bond formed between fibers (FIG. 19). Thus, these findings indicate that mechanical load-induced interactions between fiber populations within multi-fiber hydrogel networks induces a chemical reaction to permanently change the fibrous architecture of the material.

Fibrous ECMs and tissues adapt to loads by aligning in the direction of strain, which leads to anisotropic properties and topographic cues for cells. Strain-induced alignment likely occurs due to the formation of bonds between ECM fibers; however, the nature of these bonds in the ECM is unclear. Similar to ECM, we hypothesized that the developed adhesive fibers would adapt to tensile strains by forming new hydrazone bonds in the strained state, leading to residual alignment when the strain is removed. Using a custom straining device, fibrous hydrogel networks were strained 50% (150% of their original length), held for 1 hour to allow inter-fiber bonds to form, and then the strain released with the sample brought back to the original length (FIG. 10A). Confocal imaging of adhesive fibers showed significant differences in fiber alignment before and after the application of strain ($p \leq 0.001$), with fibers aligning along the axis of strain (FIG. 10B). However, non-adhesive fibers returned to their isotropic orientation after strain removal, likely due to the lack of inter-fiber bond formation during strain (FIG. 20). Additionally, adhesive fibrous hydrogel network porosity significantly decreased after strain, while non-adhesive fibrous hydrogel network porosity did not, indicating a change in pore structure with fiber adhesion (FIG. 21).

As another measure of fiber anisotropy, human mesenchymal stromal cells (hMSCs) were seeded onto fibrous networks, containing either adhesive or non-adhesive fibers and modified with the adhesive peptide RGD (FIG. 22). Without the addition of strain (i.e., stretching), cell orientation remained unorganized, likely due to the random orientation of the fibers (FIG. 23). Alternatively, the fibrous networks were strained after the seeding of hMSCs for one hour to introduce fiber alignment, released, and the cell behavior assessed again 24 hours later. Consistent with fiber orientation, hMSCs on the adhesive fibers aligned in the direction of strain, whereas there was no cell alignment observed on non-adhesive fibers. This is an additional measure of the plastic deformation of fibers to introduce alignment, as fiber alignment has been previously shown to guide cell orientation.

To support these experimental findings, we developed a discrete fiber network model wherein various fiber parameters (e.g., porosity, mixtures of fiber populations, inter-fiber bonding) within random networks can be controlled. Networks contained initial crosslinks at fiber junctions that constrained the relative motion and rotation of connected fibers and individual fibers were modeled as elastic beams with circular cross-sections. Uniaxial displacement was introduced with free network contractions in the transverse direction to mimic the uniaxial mechanical experiments. The finite element model was updated to account for the new adhesions, which after unloading caused plasticity at the scale of the network. Importantly, the fiber network model displayed residual alignment, similar to the experimental observations, when comparing fiber orientation before and after uniaxial tension (FIG. 10C).

In response to mechanical manipulation, fibrous ECM changes in geometry (e.g., lengthening) and mechanical properties (e.g., stiffening), which are thought to prevent tissues from prematurely failing. To explore strain-induced changes in adhesive fibrous hydrogel network geometry, we applied tensile strain (50%) to samples via an electromechanical testing machine (Instron) and imaged the samples before, during (holding for 10 minutes), and after strain removal (FIG. 11A). Upon removing strain, the length of the adhesive fiber mat increased as shown by the bowed appearance in the side view of the strained sample (FIG. 11A), whereas non-adhesive fibers returned to their original length (FIG. 24). This macroscale lengthening is likely a consequence of the plasticity of the network with mechanical loading, which changes the microscale fiber alignment. Supporting this, cyclic loading tests showed Mullins type softening behavior in adhesive fibers, which is associated with rearrangements of ECM fibers in tissues, while non-adhesive fibers had cycle independent stress-strain behavior (FIG. 25).

Since adhesive fibers align and form new inter-fiber bonds under strain, we hypothesized that the mechanical properties of these materials would change under load, such as under tensile testing until failure. When the adhesive and non-adhesive fibrous hydrogels were tensile tested without any holding to permit inter-fiber crosslinking, we observed that the adhesive material exhibited a greater modulus and increased stress at failure when compared to the non-adhesive materials, whereas the non-adhesive materials exhibited greater elongation prior to failure (FIG. 26). We suspect that this behavior is due to the initially enhanced inter-fiber crosslinking at junction points due to hydrazone bond formation during material fabrication (FIG. 27). To further assess changes in material properties under tensile strain, materials were strained to various extents and held to allow new inter-fiber hydrazone bond formation and then loaded to failure. The material mechanical properties are reported as instantaneous changes in the tangent modulus ($E_t$) to measure the modulus above the linearly elastic regime (i.e. high strains). Adhesive fibers held at 50% strain showed a step-change in $E_t$ (1.7 fold increase in $E_t$ compared to before holding, $p<0.0001$) upon re-application of loading (FIG. 11B), whereas adhesive fibers loaded without holding or at strains 30% did not show this step-change in $E_t$ (FIG. 28). Additionally, non-adhesive fibers did not show a change in $E_t$ in response to straining and holding (FIG. 24). We believe that microscale alignment and crosslinking between fibers that occurs when adhesive fibers are held at 50% strain contributes to stiffening. Supporting this, aligned adhesive fibrous hydrogels have significantly higher moduli than non-aligned materials (FIG. 26). Additionally, extended creep testing showed that adhesive fibers are stabilized under load, likely due to hydrazone bond formation, while non-adhesive fibers display higher rates of creep (FIG. 29).

To model the changes in $E_t$ at the scale of the entire networks, we developed a reactive continuum fiber model (Table 1, below). This model is based on our previous models of the plastic deformation of collagen networks. The model accounts for the strain-stiffening of the networks due to fiber realignment, the Poisson effect, and the subsequent formation of crosslinks at high strains. When strained in tension and held, the reactive continuum model fits the adhesive fiber experimental data well and accurately predicted the step-change in modulus (FIG. 11B). This rapid increase in the modulus was dependent on sustained bond formation time (i.e., length of time the strain was held), since the same model strained without holding did not show a step-change in $E_t$. Along with recapitulating the behavior of the material system developed, the reactive continuum model can also be used as a framework for predicting how other fibrous material formulations will behave under mechanical manipulation and highlights bond formation time as a critical parameter for mechanical changes.

Having demonstrated that new inter-fiber bonds form within adhesive fibers under mechanical loading, we next sought to explore how this property could be exploited for interfacial bonding between fibrous materials. We first performed interfacial over-lap adhesion tests between layers of fibers to assess adhesive strengths (FIG. 12B). A non-hydrated fiber mat was cut, overlaid, compressed, and hydrated with compression for 20 minutes to permit inter-fiber bond formation for adhesion testing (FIG. 30). Notably, adhesive fibers had a 14-fold higher adhesive strength than non-adhesive fibers ($p<0.0001$) (FIG. 12B). Owing to the dynamic nature of hydrazone bonds, we also found that fiber mats subjected to interfacial adhesion testing with failure at the interface could also be re-adhered with a similar adhesive strength, an important property if repeated adhesion is desired. Since the concentration of reactive groups between fibers can be tuned, we fabricated fibrous hydrogels with lower concentrations of hydrazide groups (20% of the original hydrazide formulation), and observed a ~50% decrease in adhesive strength with a reduction in the hydrazide group concentration (FIG. 12C). To increase the adhesive strength, we increased the density of fibers and consequently the density of reactive groups by fabricating aligned fibrous hydrogels, which display a 2-fold increase in adhesive strength when compared to non-aligned adhesive fibers (FIG. 12D).

For many textile and biomedical applications, the self-adhesive properties of such adhesive fibers can be explored to fabricate interesting and unique structures without the need for external glues or additional chemicals We first assessed if helical structures could be fabricated by twisting a layer of fibers to induce new bonds to stabilize the twisted structure (FIG. 13A). The adhesive fibers maintained their helical structures under vigorous mechanical agitation, whereas non-adhesive fibers unraveled with agitation (FIG. 31). Next, we investigated the formation of laminated structures through the layering of adhesive fibers, motivated by the limited thicknesses possible with electrospinning and previously explored harsh processing conditions or use of other materials to glue scaffolds together. To overcome this limitation, laminated constructs of 20 adhesive fiber mats were fabricated by layering and hydrating adhesive fibers under compression, which led to bonding between layers and their stability with mechanical agitation (FIG. 13B). Although not shown here, this layering process can be use to fabricate constructs where fiber orientation changes with depth, mimicking the complex fibrous structures in tissues such as cardiac tissue and meniscal tissue.

Electrospun scaffolds have also been used extensively for fabricating luminal structures for vascular tissue engineering and tissue conduits, but these structures are generally preformed or require annealing or suturing to hold a luminal shape, which increases the complexity of fabrication. Here, adhesive fibers were wrapped around an 18G needle, hydrated, and removed (FIG. 32) and maintained a stable luminal structure, even after vigorous mechanical agitation (FIG. 13C). 70 kDa rhodamine-dextran could be injected through lumens without noticeable leakage through the laminated area of the tube, which suggested the inter-lamellar bonds formed a tight seal. Luminal structures were stable in cell culture medium for at least 13 days at 37° C. (FIG. 33), whereas non-adhesive materials lost their luminal structure soon after removal from the needle (FIG. 31). With such a technique, damaged tissues (e.g., vessels, peripheral nerves) could be mechanically supported by adhesive fibers that are wrapped around the tissue and secured simply through the rapid interfacial bonding when the material is placed in contact with itself. Further, the mild processing techniques (e.g., water as a solvent) to fabricate adhesive fibrous hydrogel networks allow for the incorporation of therapeutics such as biologics, where their release can be further controlled through fiber engineering.

Natural ECM has mechanochemical properties that allow the ECM to adapt to loading. Although efforts have been made to model these properties in materials,[10,11] [12] none have done so without the addition of external inputs (e.g., additional monomer and chemical treatments) and while maintaining the important fibrous network architecture observed in the ECM.[1] Here, we combined multi-fiber electrospinning with complementary dynamic chemistry (i.e. hydrazone bonds) to fabricate adhesive fibrous hydrogel networks where mechanical loading induces fibers to come into contact for the reaction of chemical groups on the various fiber populations. These materials have force responsive self-adhesive properties, which can be utilized to impart changes is stiffness, geometry, and microscale anisotropy with mechanical loading, as well for the fabrication of complex structures via the adhesion of adjacent fibrous materials. Although a specific formulation of self-adhesive fibrous materials is described here, this approach can be easily extended to other fibrillar materials and reactive groups. Furthermore, the fiber network and continuum models developed can be expanded to inform future responsive material fabrication. In the rapidly growing field of fibrous material production, including as biomaterials, such self-adhesive fiber systems can facilitate the production of stimuli-responsive materials whose outputs can be tuned based on material composition, stimulus, and structure.

EXPERIMENTAL

Polymer Synthesis and Multifiber Electrospinning Parameters

Detailed procedures for NorHA, NorHA-Ald and NorHA-Hyd synthesis, and electrospinning parameters are provided elsewhere herein.

Fiber Manipulation, Straining, and Imaging

For microscale compression studies, suspended fibrous hydrogel networks were created as previously described.[37] Briefly, fibers were electrospun onto thiolated PDMS molds with 2 mm diameter wells and crosslinked (10 mW/cm² 2 hrs) in an inert environment ($N_2$). Suspended fibers were then hydrated with DPBS or DPBS containing 50 mM tert-butyl carbazate to inhibit hydrazone bond formation (Sigma-Aldrich), and placed on an inverted spinning disk microscope (Nikon) with a micromanipulator setup (Eppendorf). Micropipette tips, fabricated using a pipette puller (Sutter Instrument Co), were coated with 1% BSA (Sigma-Aldrich) for 15 minutes, and then inserted into suspended fibrous hydrogel networks for compression studies. Suspended fibers were simultaneously imaged while compressing by translating the micropipette tip 300 μm in the x-y plane at a rate of ~5 μm/sec. Inter-fiber hydrazone bond kinetics were determined by holding suspended fibers in a strained position for increasing amounts of time and then removing strain to assess plastic deformation indicative of fiber bonding. To disrupt hydrazone bonds that form during compression, plastically compressed fibers were hydrated with acetate buffer (pH 4.3), which causes hydrazone bonds to break (FIG. 19). To assess residual fiber alignment after straining, a custom straining device, was used to strain fibers and image before, during and after straining on a confocal microscope (Leica).

Fiber Network and Continuum Models

Detailed procedures for fiber network and continuum model development and parameters are provided elsewhere herein.

Mechanical Testing

Fibrous mats (~60-130 μm thick) were electrospun and cut into dogbone shapes using a surgical blade. Samples were annealed to PDMS molds for clamping using non-cured PDMS. Samples were clamped using custom grips, hydrated with saline in a custom bath, pre-tension was applied (0.002 N), and samples were strained at a rate of 1% strain/per second (Instron, 5848, 5.0 N load cell). For different tests, samples were either held at indicated strains for set amounts of time and then loaded to failure at the same rate or unloaded back to the original length. Tangent modulus ($E_t$) was calculated using the stress-strain curve. For adhesion tests, samples were sectioned mid-substance, overlaid, compressed and hydrated under compression for 20 minutes (FIG. 23). Adhered samples were clamped, loaded onto the Instron within a saline bath, and loaded to failure. For extended creep testing, short (6 mm) rectangular samples were fabricated and tested in the hydrated state using dynamic mechanical analysis (DMA, Texas Instruments).

Statistical Analysis

Statistical significance between groups was determined using a t-test, or one-way ANOVA with post hoc Tukey honestly significant difference test between groups, and Watson's two-sample test of homogeneity was used to determine significant differences between angular data with an alpha value of 0.05.

Experimental Procedures

NorHA Synthesis

All materials were purchased from Sigma Aldrich unless noted. Two NorHA precursor macromers were synthesized for making NorHA-Hyd or NorHA-Ald. Specifically, NorHA-Hyd was made by coupling hydrazide groups to NorHA that was initially synthesized from medium molecular weight HA (~76 kDa), while NorHA-Ald was synthesized by oxidizing NorHA that was initially synthesized with high molecular weight HA (~250 kDa). To solubilize HA in DMSO, sodium HA (Lifecore) was dissolved in DI $H_2O$ at 2 wt % with Dowex® resin (50Wx8 ion-change resin) at a ratio of 3:1 (resin:HA by weight) and mixed for at least 30 minutes. Resin was filtered, the filtrate was titrated to pH 7.03 with diluted tetrabutylammonium hydroxide (TBA-OH) and then frozen and lyophilized. TBA modification of HA was confirmed with NMR. HA-TBA was dissolved in anhydrous DMSO at 2 wt % with 4-(dimethylamino)pyridine (DMAP) (1.5 molar ratio to HA-TBA repeat units) and 5-norbornene-2-carboxylic acid (3:1 molar ratio to HA-TBA repeat units) under an $N_2$ atmosphere. Once fully dissolved, di-tert-butyl decarbonate ($Boc_2O$, 0.4 M ratio to HA-TBA units) was injected into the vessel and the reaction was carried out for ~20 hrs at 45° C. The reaction was quenched with 2× cold (4° C.) DI $H_2O$ and dialyzed against water with 0.25 g NaCl/L of DI $H_2O$ for 3 days. NorHA was then mixed with NaCl (1 g NaCl/100 ml solution) and precipitated in ice cold acetone (1 L acetone/100 ml solution). The precipitate was re-dissolved in DI $H_2O$, dialyzed for 5 days, frozen and lyophilized. Norbornene functionalization was confirmed with $^1H$ NMR (FIG. 14).

NorHA-Hydrazide Synthesis

NorHA-hydrazide was synthesized by dissolving NorHA at 2 t in DI $H_2O$ with adipic acid dihydrazide (13 g/g of HA). 1-ethyl-3-(3-dimethylaminopropyl)carbodiimide (EDC, 10 mM) and hydroxybezotriazole (HOBT, 10 mM) were dissolved separately in a solution of DMSO:water (1:1) and added to the reaction vessel dropwise. pH was adjusted to 6.8 with HCl initially and every 30 minutes for four hours, and then the reaction proceeded overnight at room temperature. NorHA-Hyd was then dialyzed against DI $H_2O$ for 3 days, precipitated using the same procedure carried out for NorHA above, dialyzed again for 5 days, frozen and lyophilized. Hydrazide modification of NorHA was confirmed with $^1H$ NMR (FIG. 14).

NorHA-Aldehyde Synthesis

NorHA-aldehyde was synthesized by dissolving HWM NorHA at 1 wt % in DI $H_2O$ with sodium periodate (1:4 or 1:8 periodate:HA molar ratio). The reaction was carried out for 2 hours protected from light at room temperature and quenched with 2 ml of ethylene glycol. The solution was dialyzed for 5 days against DI $H_2O$, frozen, and lyophilized. Modification of NorHA with aldehydes was confirmed with an aldehyde quantification assay (Abcam, ab138882) and Carbon-13 NMR (FIG. 15).

Peptide Synthesis

Fluorescent RGD peptides (RhodamineB-GYGRGD-SCG, 1436 g $mol^{-1}$) were synthesized with a thiol to allow for thiol-ene conjugation to NorHA, similarly to how RGD is conjugated for cell culture studies, and a fluorophore to permit visualization of the amount of peptide that was conjugated. Peptides were synthesized using solid state methods. Peptides were cleaved from resin in trifluoracetic acid, and precipitated in ether prior to lyophilization and storage at −20° C.

Electrospinning

A 3.5 wt % (NorHA, NorHA-Ald, or NorHA-Hyd), 2.5 wt % PEO (900 kDa), 0.05 (v/v) % Irgacure 2959, 4 mg/ml fluorescent dextran (rhodamine-dextran or FITC-dextran, 70 kDa), were mixed with a 0.1 stoichiometric ratio of dithiothreitol (DTT) to norbornene groups (i.e. 0.1 thiols:norbornenes) in DDI $H_2O$, mixed at 250 rpm for 24 hours protected from light and loaded into syringes for electrospinning. To simultaneously electrospin 2 polymers, electrospinning jets were positioned on opposite sides of the electrospinning mandrel (FIG. 16), while maintaining the same needle to collector distance (19 cm), flow rate (0.7 ml/hr), and voltage (+28-30 kV). Electrospinning was carried out in a custom humidity-controlled chamber (15-30% humidity) with a rotating mandrel (−5 kV, ~350 RPM), deflectors (+4 kV) and needle gauge of 18.

Cell Culture and Staining:

Electrospun fibers were sterilized with germicidal UV for 1 hour, hydrated in DPBS, and conjugated with adhesive RGD peptides (sequence: GCGYGRGDSPG, GenScript). Fibrous hydrogels were incubated in a solution of 1 mM thiolated-RGD, 0.05 (v/v) % 12959, and DPBS and RGD was conjugated to norbornene groups on HA using a photoinitiated thiol-ene reaction (5 mw/cm² UV, 5 minutes). Fibers were washed 3 times with DPBS before cell seeding. Human mesenchymal stem cells (Lonza), passage 3, were cultured in alphaMEM (Gibco) supplemented with 10% FBS and 1% penicillin/streptomycin solution (Gibco). Cells were trypsinized with 0.05% Trypsin EDTA (Gibco) and seeded at $1.5 \times 10^5$ cells/ml directly onto the fibrous hydrogel networks, with a total volume of 1 ml. Cells were cultured on scaffolds, fixed with 4% formalin, actin and DNA were labeled with Alexa Flour 647 phalloidin (Thermo Fischer) and hoechst 33342, respectively.

Fiber Network Model:

To model the inelastic realignment of fibers after unloading of the fibrous matrices, we employed a discrete fiber network model. Random networks were generated by the deposition of two different types of fibers in a planar domain. The position and orientation of the initially straight fibers were sampled from uniform probability distributions. The intersection points of the fibers were identified as crosslinks that modeled the initial junctions between the deposited fibers. These crosslinks constrained the relative motion and rotation of the two connected fibers and were modeled as rigid connections. Adhesions were also formed when fibers of different types came close during the deformation of the networks.[2]. Individual fibers were modeled using elastic beams with circular cross-sections of diameters 0.5 µm and 0.8 µm for the hydrazide and aldehyde fibers, respectively. The finite element simulations were performed using beams with reduced integration[3] and an implicit solution method. Displacement-controlled tests were conducted by prescribing nodal displacements at the network boundaries in the direction of loading while allowing free network contractions in the transverse direction. The finite element model was updated after the addition or removal of elements, which modeled the new adhesions, and elastodynamic (inertial) effects were not considered in the simulations. Finite element calculations were performed using the ABAQUS software package.

Continuum Model:

A coarse-grained model of the deformation of the networks was developed using an inelastic constitutive law. This model represented the inelastic deformation of the network at the scale of the whole sample. At the time t, the state of deformation was described by the deformation gradient, $F(t) = \nabla_X x$, where X and x denote the coordinates of the material particles at times 0 and t, respectively. The strain energy density required to deform the network by F(t) was denoted by W. The model accounts for both the preexisting crosslinks, representing the inter-fiber junctions and the crosslinks formed during deformation. As the network is stretched, it contracts in the direction transverse to loading. The previously distant fibers come close and form new adhesions. At the time τ, crosslinks form at the rate $\bar{K}_{on}$, and all previously formed crosslinks dissociate at the rate $\bar{K}_{off}\rho(\tau)$, where $\rho(\tau)$ is the density of crosslinks formed at the time r. The deformation of each group of crosslinks was tracked with respect to the configuration where they were formed. The relative deformation gradient from time τ to time t was evaluated as $$F(\tau,t) = F(t)F(\tau)^{-1}. \quad (1)$$

The strain energy density of the network was $$W = \int_0^t W^*(F(\tau, t))\rho(\tau)d\tau. \quad (2)$$

W* can be expressed as $$W^* = W_b(\overline{I},J) + \sum_{i=1}^{3} f(\lambda_i), \quad (3)$$

where $W_b$ is a neo-Hookean energy density, representing the unaligned fibers and $f$ is an exponential function, expressing the strain-stiffening of the fibers re-aligned to the direction of maximum stretch during deformation. $W_b$ includes the parameters resembling bulk and shear moduli of 600 (kPa) and 300 (kPa), respectively, previously outlined. $f$ was described by a fibrous stiffness of 300 (kPa), an exponent of stiffening of 2, and a threshold stretch of 1.01.

The stretch dependent formation of crosslinks was modeled by a crosslink formation rate constant $\overline{k}_{on}$ equal to $\overline{k}_{on}^0 \lambda$ for $\lambda < \lambda_{on}^0$, where $\overline{k}_{on}^0$ is the rate constant prior to deformation, and $\lambda$ is the maximum principal stretch. $\lambda_{on}^0$ is the threshold for the transition to a regime where the formation of crosslinks is accelerated by the highly deformed state of the network. After the threshold stretch, $\overline{k}_{on}$ was increased by $\overline{k}_{on}^0 \beta_{on} (\lambda - \lambda_{on}^0)$. $\beta_{on}$ is a constant that tunes the activation of crosslink formation during deformation. Similarly, the rate constant of crosslink dissociation was expressed as $\overline{k}_{off}^0 \lambda$ at $\lambda < \lambda_{off}^0$, where $\overline{k}_{off}^0$ and $\lambda_{off}^0$ denote the rate constant for the dissociation of crosslinks in the absence of deformation and the threshold for the accelerated dissociation of crosslinks. For $\lambda > \lambda_{off}^0$, the rate of dissociation was increased by $\overline{k}_{off}^0 \beta_{off} (\lambda - \lambda_{off}^0)$, where $\beta_{off}$ is a constant that tunes the increase of crosslink dissociation at large deformations. Two types of bonds were used to reproduce the experimentally observed stiffness of networks with and without holding during deformation. Prior to deformation, the rates of bond formation and dissociation were equal, leading to a density of crosslinks of $\overline{k}_{on}/\overline{k}_{off}$ for each type of bond.

| Parameters that describe the formation and dissociation of crosslinks in the coarse-grained constitutive model. | | |
|---|---|---|
| Parameter | Value, type 1 | Value, type 2 |
| $\overline{k}_{off}^0$ | $2.38 \times 10^{-5}$ s$^{-1}$ | $3.3 \times 10^{-4}$ s$^{-1}$ |
| $\overline{k}_{on}^0$ | $2.38 \times 10^{-4}$ s$^{-1}$ | $5.5 \times 10^{-6}$ s$^{-1}$ |
| $\lambda_{on}^0$ | 1.4 | 1.49 |
| $\lambda_{off}^0$ | 1.4 | 1.51 |
| $\beta_{on}$ | 0.0 | $7 \times 10^5$ |
| $\beta_{off}$ | 50.0 | 120.0 |

EMBODIMENTS

The following non-limiting embodiments are illustrative only and do not limit the scope of the present disclosure or the appended claims.

Embodiment 1. A fibrous composition, comprising: a first fiber population that comprises a plurality of first fibers having a first bonding group disposed at least on a surface of the first fibers, the first fibers comprising a first matrix material; a second fiber population that comprises a plurality of second fibers having a second bonding group disposed at least on a surface of the second fibers, the second fibers comprising a second matrix material, (a) the first bonding group being configured to interact with the second bonding group so as to effect crosslinking between at least one fiber of the first fiber population and at least one fiber of the second fiber population upon application of a mechanical manipulation that reduces a distance between the first and the second bonding groups, or (b) the first bonding group being configured to interact with the second bonding group so as to effect crosslinking between at least one fiber of the first fiber population and at least one fiber of the second fiber population upon application of a stimulus, or (c) both (a) and (b). (As explained elsewhere herein, the first matrix material and the second matrix material can be same material but can also be different materials.)

Embodiment 2. The fibrous composition of Embodiment 1, wherein the crosslink comprises a covalent bond.

Embodiment 3. The fibrous composition of any one of Embodiments 1-2, wherein the crosslink comprises a physical bond, a guest/host bond, or any combination thereof. A guest/host bond can be, e.g., a complex that comprises two or more molecules or ions that are held together in unique structural relationships by forces other than those of full covalent bonds.

Embodiment 4. The fibrous composition of any one of Embodiments 1-3, wherein the crosslink comprises an ionic bond.

Embodiment 5. The fibrous composition of any one of Embodiments 1-4, wherein the crosslink comprises a pi-pi orbital interaction.

Embodiment 6. The fibrous composition of any one of Embodiments 1-5, wherein at least one of the first bonding group and the second bonding group comprises acrylate, acrylamide, an alcohol, an optionally protected alcohol, aldehyde, alkyne, optionally protected amine, anhydride, azide, carboxy, epoxy, ester, hydrazide, ketone, maleimide, methacrylate, styrenyl, a thiol, an optionally protected thiol, a vinyl or a vinyl sulfone group, or any combination thereof.

Embodiment 7. The fibrous composition of any one of Embodiments 1-6, wherein at least one of the first bonding group and the second bonding group comprises a protein, a nucleic acid, an aptamer, a peptide, or any combination thereof.

Embodiment 8. The fibrous composition of any one of Embodiments 1-7, wherein the crosslink comprises an alpha-cyclodextrin/hexyl group pair, an alpha-cyclodextrin/polyethylene oxide group pair, a beta-cyclodextrin/adamantane group pair, a beta-cyclodextrin/cyclohexyl group pair, a beta-cyclodextrin/benzyl group pair, a gamma-cyclodextrin/cyclodecyl group pair, a cucurbituril/hexanediamine group pair, a cucurbituril/spermine group pair, or any combination thereof.

Embodiment 9. The fibrous composition of any one of Embodiments 1-8, wherein at least one of the fiber populations comprises (e.g., as the first and/or second matrix material) agarose, alginate, RGD-modified alginate, amylase, amylpectin, cellulose, chitosan, collagen, keratin, elastin, fibronectin, dextran, fibrin, gelatin, glycogen, heparin, hyaluronic acid, poly(acrylamide), poly(O-aminoester), poly(caprolactone), matrigel, multi-arm polyethylene glycol, poly-hydroxyethyl acrylate, poly(hydroxyethyl methacrylate), poly(N-isopropylacrylamide), poly(glycolic acid), poly(lactic acid), poly(lactic acid-glycolic acid), oligo(poly (ethylene glycol)fumarate), poly(vinyl alcohol), poly(vinyl acid), or any combination thereof. Biocompatible polymers are considered especially suitable.

Embodiment 10. The fibrous composition of any one of Embodiments 1-9, wherein (a) the first fiber population comprises the first bonding group and a third bonding group, the first and third bonding groups differing from one another, or (b) the second fiber population comprises the second bonding group and a fourth bonding group, the second and fourth bonding groups differing from one another, or both (a) and (b). Thus, a fiber can comprise one, two, three, or even more different bonding groups on the surface. It should be understood that although bonding groups can be disposed on the surface of a fiber, bonding groups can also be disposed within the matrix material of the fiber, e.g., within the fiber itself. There is no requirement that all bonding groups of a fiber be displayed on the fiber's surface.

Embodiment 11. The fibrous composition of any one of Embodiments 1-10, wherein the first matrix material and the second matrix material are the same material.

Embodiment 12. The fibrous composition of any one of Embodiments 1-10, wherein the first matrix material and the second matrix material differ from one another. The first and second matrix materials can differ in, e.g., thickness, composition, length, mechanical properties, or other aspect.

Embodiment 13. The fibrous composition of any one of Embodiments 1-12, wherein the crosslinking persists following application of the mechanical manipulation, wherein the fibrous composition retains a shape achieved following application of the mechanical manipulation, or both. It should be understood that the fibrous composition can maintain crosslinking and/or shape following application of a further mechanical manipulation following the manipulation that gave rise to the crosslinking.

As an example, crosslinking can persist following the application of a stretching/strain. The shape attained by the fibrous composition (e.g., a narrowing and/or elongation) can also persist following application of the mechanical manipulation.

Embodiment 14. The fibrous composition of any one of Embodiments 1-13, further comprising an additive (e.g., a bioactive molecule, a medicament, a drug, a neutraceutical or any combination thereof). As an example, an additive (such as a drug) can be disposed within the matrix of a fiber, with the fiber being configured to release the drug over a period of time. Such an embodiment is useful in, e.g., wound dressings, in which a fibrous composition is wrapped about a bodily tissue of interest. The wrapping in turn gives rise to the formation of bonds (i.e., crosslinking) between adjacent fibers, thereby maintaining the fibrous composition in place at the location of interest. The drug (e.g., an analgesic) is then released from the wound dressing while the wound dressing is located at the site of interest.

Embodiment 15. The fibrous composition of any one of Embodiments 1-14, further comprising a species configured to disrupt the crosslinking. Such a species can be used to, e.g., disrupt the crosslinking, which can in turn allow for loosening or removal of the fibrous composition from a given location. As one example, if a fibrous composition is used as a support wrap to support a body tissue following surgery or trauma, the composition can self-release a disrupting agent that is stored within the composition at the appropriate time to aid in loosening the composition.

Embodiment 16. The fibrous composition of any one of Embodiments 1-15, further comprising a degradable material disposed on the first bonding group, the second bonding group or both. The degradable material can be, e.g., water-soluble. The degradable material can be configured such that it degrades over time (or upon exposure to a suitable stimulus) so as to uncover the bonding group, making the bonding group available for fiber-fiber bonding. This can be used to maintain a fiber in an un-crosslinked configuration (e.g., during insertion into a patient) until the cross-linking is needed or desired.

Embodiment 17. The fibrous composition of any one of Embodiments 1-16, wherein the mechanical manipulation comprises stretching, twisting, compressing, bending, shearing or any combination thereof.

Embodiment 18. The fibrous composition of any one of Embodiments 1-17, wherein the external stimulus comprises a hydration, an illumination, a temperature, a pH, a catalyst, or any combination thereof.

Embodiment 19. The fibrous composition of any one of Embodiments 1-18, wherein the fibrous composition is configured to adhere to a bodily tissue. In this way, the fibrous composition can be configured to adhere "in place" when contacted to a bodily tissue, eliminating the need for sutures, elastics, or other adhesives.

Embodiment 20. The fibrous composition of any one of Embodiments 1-19, wherein one or both of the first fiber population and the second fiber population are arranged in a ply.

Embodiment 21. The fibrous composition of Embodiment 20, wherein the fibrous composition comprises a plurality of plies. Thus, a fibrous composition can comprise a "stack" of plies, and a mechanical manipulation can be effected to bond adjacent plies together.

Embodiment 22. A method, comprising: effecting application of a mechanical manipulation, a stimulus, or both to a fibrous composition according to any one of Embodiments 1-21.

Embodiment 23. The method of Embodiment 22, wherein the effecting application of a mechanical manipulation, a stimulus, or both effects a persistent change in a three-dimensional configuration of the composition.

Embodiment 24. The method of any one of Embodiments 22-23, wherein the effecting application of a mechanical manipulation, a stimulus, or both effects a persistent change in a mechanical property (e.g., stiffness) of the composition.

Embodiment 25. The method of any one of Embodiments 22-24, further comprising disposing the composition about a substrate. Such a substrate can be a mold, mandrel, or other substrate to which the user would like the fibrous composition to conform.

Embodiment 26. The method of Embodiment 25, wherein the substrate is a bodily tissue.

Embodiment 27. A method, comprising: with a composition that comprises (i) a first fiber population, where the fibers comprise a first bonding group disposed on a surface of the first fiber and (ii) a second fiber population, where the fibers comprise a second bonding group disposed on a surface of the second fiber and the first bonding group being configured to interact with the second bonding group so as to effect a crosslink between the first and the second fiber populations, (a) effecting a mechanical manipulation that reduces a distance between the first bonding group and the second bonding group under conditions sufficient to give rise to a crosslink between the first and the second fiber populations; (b) effecting application of a stimulus so as to effect a crosslink between the first fiber and the second fiber upon application of a stimulus; or (c) both (a) and (b).

Embodiment 28. The method of Embodiment 27, wherein the mechanical manipulation is applied for a period of time and released, wherein the mechanical manipulation is repeated, wherein the mechanical manipulation is reversed (e.g., pressing fibers together followed by peeling the fibers apart), or any combination thereof.

Embodiment 29. The method of any one of Embodiments 27-28, wherein the stimulus is applied for a period of time and released.

Embodiment 30. The method of any one of Embodiments 27-29, wherein the mechanical manipulation, the stimulus, or both is applied to effect adhesion between a bodily tissue and one or both of the first fiber and the second fiber.

Embodiment 31. The method of any one of Embodiments 27-30, wherein the mechanical manipulation comprises disposing the composition about a bodily tissue.

Embodiment 32. A method, comprising: forming a first fiber population comprising a plurality of first fibers, a first fiber comprising a first matrix material and a first bonding group disposed at least on a surface of the first fiber; forming a second fiber population comprising a plurality of second fibers, a second fiber comprising a second matrix material and a second bonding group disposed at least on a surface of the second fiber. (As described elsewhere herein, the first and second matrix materials can be the same, but can also be different.)

Fibers can be created by, e.g., electrospinning, extrusion, self-assembly, phase separation, and the like. A user can create fibers from starting materials and then assemble those fibers into a fiber population; a user can also assembly pre-made fibers into a fiber population.

Embodiment 33. The method of Embodiment 32, further comprising forming a ply that comprises the first fiber, the second fiber, or both.

Embodiment 34. The method of Embodiment 33, further comprising forming a plurality of plies.

Embodiment 35. The method of any one of Embodiments 32-34, further comprising placing the first bonding group on the surface of the first fiber.

Embodiment 36. The method of any one of Embodiments 32-35, further comprising placing the second bonding group on the surface of the second fiber.

Embodiment 37. The method of any one of Embodiments 32-36, further comprising braiding the first fiber and the second fiber.

Embodiment 38. The method of any one of Embodiments 32-36, wherein the first matrix material and the second matrix material comprise the same material.

Embodiment 39. The method of any one of Embodiments 32-36, wherein the first matrix material and the second matrix material differ from one another. The first and second matrix materials can differ in, e.g., thickness, composition, length, mechanical properties, or other aspect.

Embodiment 40. The method of any one of Embodiments 32-39, further comprising (a) effecting a mechanical manipulation that reduces a distance between the first bonding group and the second bonding group under conditions sufficient to give rise to a crosslink between the first fiber and the second fiber; (b) effecting application of a stimulus so as to effect a crosslink between the first fiber and the second fiber upon application of a stimulus; or (c) both (a) and (b).

REFERENCES

Shi, Q.; Wan, K.-T.; Wong, S.-C.; Chen, P.; Blackledge, T. A. Do Electrospun Polymer Fibers Stick?Langmuir 2010, 26 (17), 14188-14193.

Perazzo, A.; Nunes, J. K.; Guido, S.; Stone, H. A. Flow-Induced Gelation of Microfiber Suspensions. Proc. Natl. Acad. Sci. U.S.A 2017, 114 (41), E8557-E8564.

Joo, C. W.; Kim, S. H. Formation of Interfiber Bonding in Electrospun Poly(etherimide) Nanofiber Web. Artic. J. Mater. Sci. 2004.

Raghavan, B. K.; Coffin, D. W. Control of Inter-Fiber Fusing for Nanofiber Webs via Electrospinning; Vol. 6.

Muheremu, A.; Ao, Q. Past, Present, and Future of Nerve Conduits in the Treatment of Peripheral Nerve Injury. Biomed Res. Int. 2015, 2015, 1-6.

Arslantunali, D.; Dursun, T.; Yucel, D.; Hasirci, N.; Hasirci, V. Peripheral Nerve Conduits: Technology Update. Med. Devices (Auckl). 2014, 7, 405-424.

What is claimed:

1. A fibrous composition, comprising:
a first fiber population that comprises a plurality of first fibers having a first bonding group disposed at least on a surface of the first fibers,
the first fibers comprising a first matrix material; and
a second fiber population that comprises a plurality of second fibers having a second bonding group disposed at least on a surface of the second fibers, and
the second fibers comprising a second matrix material,
the first bonding group being configured to interact with the second bonding group so as to introduce crosslinks between at least one fiber of the first fiber population and at least one fiber of the second fiber population upon application of a mechanical manipulation that reduces a distance between the first and the second bonding groups, and
wherein the crosslinks persist following application of the mechanical manipulation, wherein the fibrous composition retains a shape achieved following application of the mechanical manipulation.

2. The fibrous composition of claim 1, wherein a crosslink comprises a covalent bond.

3. The fibrous composition of claim 1, wherein a crosslink comprises an ionic bond.

4. The fibrous composition of claim 1, wherein a crosslink comprises a pi-pi orbital interaction.

5. The fibrous composition of claim 1, wherein at least one of the first bonding group and the second bonding group comprises acrylate, acrylamide, optionally protected alcohol, aldehyde, alkyne, optionally protected amine, anhydride, azide, carboxy, epoxy, ester, hydrazide, ketone, maleimide, methacrylate, styrenyl, optionally protected thiol, vinyl or vinyl sulfone group, or any combination thereof.

6. The fibrous composition of claim 1, wherein at least one of the first bonding group and the second bonding group comprises a protein, a nucleic acid, an aptamer, a peptide, or any combination thereof.

7. The fibrous composition of claim 1, wherein a crosslink comprises an alpha-cyclodextrin/hexyl group pair, an alpha-cyclodextrin/polyethylene oxide group pair, a beta-cyclodextrin/adamantane group pair, a beta-cyclodextrin/cyclohexyl group pair, a beta-cyclodextrin/benzyl group pair, a gamma-cyclodextrin/cyclodecyl group pair, a cucurbituril/hexanediamine group pair, a cucurbituril/spermine group pair, or any combination thereof.

8. The fibrous composition of claim 1, wherein at least one of the fiber populations comprises agarose, alginate, RGD-modified alginate, amylase, amylpectin, cellulose, chitosan, collagen, keratin, elastin, fibronectin, dextran, fibrin, gelatin, glycogen, heparin, hyaluronic acid, poly(acrylamide), poly(β-aminoester), poly(caprolactone), solubilized basement membrane matrix secreted by Engelbreth-Holm-Swarm (EHS) mouse sarcoma cells, multi-arm polyethylene glycol, poly-hydroxyethyl acrylate, poly(hydroxyethyl methacrylate), poly(N-isopropylacrylamide), poly(glycolic acid), poly(lactic acid), poly(lactic acid-glycolic acid), oligo (poly(ethylene glycol)fumarate), poly(vinyl alcohol), poly (vinyl acid), or any combination thereof.

9. The fibrous composition of claim 1, wherein (a) the first fiber population comprises the first bonding group and a third bonding group, the first and third bonding groups differing from one another, or (b) the second fiber population comprises the second bonding group and a fourth bonding group, the second and fourth bonding groups differing from one another, or both (a) and (b).

10. The fibrous composition of claim 1, further comprising an additive, the additive optionally comprising a bioactive molecule, a medicament, a drug, a neutraceutical, or any combination thereof.

11. The fibrous composition of claim 1, wherein the mechanical manipulation comprises stretching, twisting, bending, compressing, shearing or any combination thereof.

12. The fibrous composition of claim 1, wherein the fibrous composition is configured to adhere to a bodily tissue.

13. The fibrous composition of claim 1, wherein one or both of the first fiber population and the second fiber population are arranged in a ply.

14. The fibrous composition of claim 1, wherein the first fibers comprise processed fibers and wherein the second fibers comprise processed fibers.

* * * * *

UNITED STATES PATENT AND TRADEMARK OFFICE
CERTIFICATE OF CORRECTION

| | |
|---|---|
| PATENT NO. | : 12,440,601 B2 |
| APPLICATION NO. | : 17/201446 |
| DATED | : October 14, 2025 |
| INVENTOR(S) | : Matthew Davidson et al. |

It is certified that error appears in the above-identified patent and that said Letters Patent is hereby corrected as shown below:

In the Specification

Under Column no. 3, Line no. 26, Replace:
"FIG."
With:
--FIGS.--

Under Column no. 3, Line no. 53, Replace:
"FIG."
With:
--FIGS.--

Under Column no. 3, Line no. 63, Replace:
"8a"
With:
--8A--

Under Column no. 5, Line no. 37, Replace:
"β-D-glucoronic"
With:
--β-D-glucuronic--

Under Column no. 7, Line no. 9, Replace:
"Red"
With:
--The--

Signed and Sealed this
Thirteenth Day of January, 2026

John A. Squires
*Director of the United States Patent and Trademark Office*

CERTIFICATE OF CORRECTION (continued)
U.S. Pat. No. 12,440,601 B2

Under Column no. 9, Line nos. 11-12, Replace:
"aldehyde (green) and hydrazide
(red)"
With:
--aldehyde and hydrazide--

Under Column no. 9, Line no. 52, Replace:
"FIG."
With:
--FIGS.--

Under Column no. 10, Line no. 12, Replace:
"FIG."
With:
--FIGS.--

Under Column no. 10, Line no. 22, Replace:
"8a"
With:
--8A--

Under Column no. 11, Line no. 61, Replace:
"β-D-glucoronic"
With:
--β-D-glucuronic--

Under Column no. 11, Line no. 64, Replace:
"ppm, green)."
With:
--ppm).--

Under Column no. 14, Line no. 55, Replace:
"(FIG."
With:
--(FIGS.--

Under Column no. 14, Line no. 59, Replace:
"FIG. 3, c and d"
With:
--FIGS. 3, 3C and 3D--

CERTIFICATE OF CORRECTION (continued)
U.S. Pat. No. 12,440,601 B2

Under Column no. 15, Line no. 3, Replace:
"FIG."
With:
--FIGS.--

Under Column no. 15, Line no. 10, Replace:
"FIG."
With:
--FIGS.--

Under Column no. 15, Line no. 66, Replace:
"amylpectin,"
With:
--amylopectin,--

Under Column no. 23, Line no. 15, Replace:
"hydroxybezotriazole"
With:
--hydroxybenzotriazole--

Under Column no. 26, Line no. 49, Replace:
"amylpectin,"
With:
--amylopectin,--

Under Column no. 27, Line no. 31, Replace:
"neutraceutical"
With:
--nutraceutical--

Under Column no. 29, Line no. 59, Replace:
"U.S.A"
With:
--U.S.A.--

In the Claims

Under Column no. 30, Claim 8, Line no. 52, Replace:
"amylpectin,"
With:
--amylopectin,--

Under Column no. 31, Claim 10, Line no. 5, Replace:
"neutraceutical"
With:
--nutraceutical--